US010263225B2

(12) United States Patent
Zouta et al.

(10) Patent No.: US 10,263,225 B2
(45) Date of Patent: Apr. 16, 2019

(54) FLAME-RETARDANT SHEET OR FILM, PRODUCTS COMPRISING THE SAME AND PROCESS FOR PRODUCTION THEREOF

(71) Applicants: MITSUBISHI GAS CHEMICAL COMPANY, INC., Tokyo (JP); MGC FILSHEET CO., LTD., Saitama (JP)

(72) Inventors: Keiichi Zouta, Tokyo (JP); Kimitaka Nakao, Tokyo (JP); Yuko Takagi, Mie (JP); Hiroki Ishii, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 266 days.

(21) Appl. No.: 14/900,386

(22) PCT Filed: Jun. 18, 2014

(86) PCT No.: PCT/JP2014/066182
§ 371 (c)(1),
(2) Date: Dec. 21, 2015

(87) PCT Pub. No.: WO2014/208423
PCT Pub. Date: Dec. 31, 2014

(65) Prior Publication Data
US 2016/0181576 A1    Jun. 23, 2016

(30) Foreign Application Priority Data

Jun. 26, 2013 (JP) ................. 2013-134331

(51) Int. Cl.
*H01M 2/02* (2006.01)
*C08J 5/18* (2006.01)
*C08K 13/02* (2006.01)
*C08K 5/103* (2006.01)
*C08K 5/526* (2006.01)
*C08K 5/5399* (2006.01)
*C08K 5/521* (2006.01)
*C08K 5/49* (2006.01)

(52) U.S. Cl.
CPC ............ *H01M 2/0295* (2013.01); *C08J 5/18* (2013.01); *C08K 5/103* (2013.01); *C08K 5/49* (2013.01); *C08K 5/521* (2013.01); *C08K 5/526* (2013.01); *C08K 5/5399* (2013.01); *C08K 13/02* (2013.01); *H01M 2/0202* (2013.01); *C08J 2369/00* (2013.01); *C08J 2427/18* (2013.01); *H01M 2220/30* (2013.01)

(58) Field of Classification Search
CPC ............ H01M 2/0295; H01M 2/0202; H01M 2220/30; C08K 5/103; C08K 5/525; C08K 5/49; C08K 5/521; C08K 5/5399; C08K 13/02; C08J 5/18; C08J 2427/18; C08J 2369/00

See application file for complete search history.

(56) References Cited

U.S. PATENT DOCUMENTS

| 7,259,201 B2 * | 8/2007 | Gallucci ................. C08K 5/42 264/176.1 |
| 2002/0018932 A1 | 2/2002 | Chikada |
| 2004/0147655 A1 * | 7/2004 | Sawaki ............... C08G 64/406 524/425 |
| 2007/0105994 A1 | 5/2007 | Gang et al. |
| 2007/0218293 A1 * | 9/2007 | Kawato ...................... C08J 5/18 428/412 |
| 2009/0098417 A1 * | 4/2009 | Yamada ............. H01M 2/0212 429/7 |
| 2009/0186168 A1 | 7/2009 | Hideaki et al. |
| 2009/0303411 A1 | 12/2009 | Hiroshi et al. |
| 2009/0317567 A1 * | 12/2009 | Takeda ....................... C08J 5/18 428/1.33 |
| 2010/0310911 A1 * | 12/2010 | Yamamoto .......... H01M 2/0212 429/94 |

(Continued)

FOREIGN PATENT DOCUMENTS

| CN | 102863772 | 1/2013 |
| CN | 102276970 | 4/2013 |

(Continued)

OTHER PUBLICATIONS

Search Report issued in PCT/JP2014/066182, dated Sep. 16, 2014.
European Search Report issued in Patent Application No. 14818753.7, dated Jan. 4, 2017.
Office Action issued in Japan Counterpart Patent Appl. No. 2015-524001, dated Jul. 24, 2018.
EPO Communication of a notice of opposition dated Feb. 12, 2019, concerning the opposition filed by the third party to the corresponding European Patent No. 3015494.

(Continued)

Primary Examiner — Ula C Ruddock
Assistant Examiner — Matthew W Van Oudenaren
(74) Attorney, Agent, or Firm — Greenblum & Bernstein, P.L.C.

(57) ABSTRACT

A thin sheet or film excellent in flame retardancy and light-blocking properties is provided. A battery pack case and others with high flame retardancy are each molded from this thin film. A thin sheet or film Including a specific phosphorus-containing flame retardant in a polycarbonate resin is excellent in thickness accuracy, flame retardancy and appearance. A thin sheet or film excellent in flame retardancy and also having a thickness of 0.01 to 0.25 mm was formed when controlling its thickness uniformly during sheet or film molding. Further, upon addition of carbon black, the resulting sheet or film was found to have good light-blocking properties and higher flame retardancy. Moreover, when used as a film packaging material for battery packs, the sheet or film of the present invention was found to be excellent in film strength and ultrasonic weldability.

13 Claims, No Drawings

(56) References Cited

U.S. PATENT DOCUMENTS

| | | | |
|---|---|---|---|
| 2011/0097566 A1 | 4/2011 | Higaki | |
| 2012/0183831 A1* | 7/2012 | Jeong | H01M 2/1061 429/120 |
| 2012/0244423 A1* | 9/2012 | Kusukawa | H01M 10/0585 429/178 |
| 2012/0287556 A1 | 11/2012 | Silvi et al. | |

FOREIGN PATENT DOCUMENTS

| | | |
|---|---|---|
| EP | 0 207 359 | 7/1987 |
| EP | 2712892 | 4/2014 |
| JP | 54-32456 | 3/1979 |
| JP | 62-4746 | 1/1987 |
| JP | 2000-169696 | 6/2000 |
| JP | 2002-30209 | 1/2002 |
| JP | 2002030209 * | 1/2002 |
| JP | 2002-50329 | 2/2002 |
| JP | 2002-194100 | 7/2002 |
| JP | 2003-197168 | 7/2003 |
| JP | 2003-297305 | 10/2003 |
| JP | 3605719 | 12/2004 |
| JP | 2008-280491 | 11/2008 |
| JP | 2008-285507 | 11/2008 |
| JP | 2008285507 * | 11/2008 |
| JP | 2008-303320 | 12/2008 |
| JP | 2009-7487 | 1/2009 |
| JP | 2011-57888 | 3/2011 |
| JP | 2013-101902 | 5/2013 |
| KR | 2010-0073926 | 7/2010 |
| WO | 2007/055305 | 5/2007 |
| WO | 2012/161134 | 11/2012 |

OTHER PUBLICATIONS

David A. Grewell et al., Plastics and Composites Welding Handbook, pp. 143, 173, 174, 176.

Danielle Bright et al., Journal of Vinyl & Additive Technology, Jun. 1997, vol. 3, No. 2, pp. 170-174.

Technical Report SABIC Technology Center, Bergen op Zoom, Jan. 2019.

* cited by examiner

FLAME-RETARDANT SHEET OR FILM, PRODUCTS COMPRISING THE SAME AND PROCESS FOR PRODUCTION THEREOF

TECHNICAL FIELD

The present invention relates to a sheet or film comprising a polycarbonate resin composition. More specifically, the present invention relates to a sheet or film excellent in flame retardancy, heat resistance, heat and moisture resistance, low shrinkage, molding processability, surface appearance and insert adhesion, as well as products comprising such a sheet or film, e.g., a flame-retardant battery pack case and so on.

BACKGROUND ART

Polycarbonate resins are excellent in heat resistance and mechanical properties and therefore widely used as automobile materials, electrical and electronic device materials, housing materials, and other industrial materials for making parts and components, by way of example. Products including these resin molded articles are required to have flame retardancy in terms of safety for the purpose of fire prevention at high temperatures. In particular, flame-retarded polycarbonate resin compositions are preferably used as casings and interior parts for OA and information appliances such as computers, notebook personal computers, mobile phones, printers, copying machines and so on.

As means to impart flame retardancy to polycarbonate resins, conventionally widely known are techniques to blend polycarbonate resins with halogen-containing flame retardants such as organic bromine compounds.

However, resin compositions obtained by blending polycarbonate resins with halogen-containing flame retardants may have reduced heat stability and may also cause the corrosion of screws and/or dies in molding machines during molding process. Moreover, in the case of using halogen-containing flame retardants, gases containing the halogens may be generated upon burning, and environmental pollution may also arise as a problem during disposal and collection of products. For these reasons, there has been a demand for flame retardation without using any halogen-containing flame retardant.

On the other hand, as techniques to impart flame retardancy without using any halogen-containing flame retardant, those using phosphorus-containing flame retardants in polycarbonate resins are now being studied extensively. As phosphorus-containing flame retardants, phosphate esters, ammonium polyphosphates and so on are known. As for polycarbonate resin compositions blended with phosphorus-containing flame retardants, Patent Document 1 is known, by way of example.

However, techniques to blend polycarbonate resins with phosphorus-containing flame retardants have a drawback in that impact resistance inherent to polycarbonate resins is greatly reduced, although it is possible to obtain polycarbonate resins with high flame retardancy and good fluidity.

Phosphazene compounds containing nitrogen and phosphorus (e.g., aryloxyphosphazenes, alkoxyphosphazenes, thiophosphazenes, halogenated phosphazenes, and phosphazene polymers derived from these compounds) are useful compounds for use in flame retardants, lubricating oils, fire-resistant electrolytes, carcinostatic agents and so on, and have been studied in various fields. Particularly in recent years, phosphazene compounds have received attention because of having not only a high phosphorus content, but also high heat resistance, hydrolysis resistance and flame retardancy; and there have already been proposed some techniques using phosphazene compounds for flame retardation of resin compositions (e.g., Patent Document 2).

On the other hand, in recent years, organic sulfonic acid metal salt compounds, typified by organic sulfonic acid alkali metal salt compounds and organic alkaline earth metal salt compounds (see, e.g., Patent Documents 3 and 4), have been studied extensively as useful flame retardants.

Moreover, as one of the applications of these flame-retardant polycarbonate materials, battery packs obtained by injection molding of the resins are known (see, e.g., Patent Documents 5 to 8). In response to recent reductions in the size and thickness of products, there has been a demand for smaller sized battery packs with large capacity. For this purpose, battery pack cases used to hold batteries therein are required to have thinner walls. However, injection molding commonly used for their production requires extremely high fluidity, and materials based on the combination of currently used phosphorus-containing flame retardants and polycarbonates are not sufficient to achieve the balance of fluidity, strength and heat resistance and therefore cannot be used as products.

PRIOR ART DOCUMENTS

Patent Documents

Patent Document 1: JP 62-4746 A
Patent Document 2: JP Patent No. 3605719
Patent Document 3: JP 54-32456 B
Patent Document 4: JP 2000-169696 A
Patent Document 5: JP 2011-057888 A
Patent Document 6: JP 2009-007487 A
Patent Document 7: JP 2008-285507 A
Patent Document 8: JP 2008-280491 A

SUMMARY OF THE INVENTION

Problem to be Solved by the Invention

A problem of the present invention is to provide a flame-retardant sheet or film prepared from a flame-retardant resin composition composed of a polycarbonate resin containing a flame retardant by being extruded into a sheet shape through an extruder equipped with a T-die or the like and then being cooled, wherein the sheet or film is configured to have a uniform thickness distribution to thereby give a highly flame-retardant sheet or film and is further configured to comprise, e.g., carbon black to thereby give a flame-retardant sheet or film also having light-blocking properties. In particular, in most cases of sheets or films, thinner ones are more difficult to flame retard; and hence a problem of the present invention is to provide a sheet or film having good flame retardancy even when it is thin.

A further problem of the present invention is to provide thin-walled products with high flame retardancy, particularly a battery pack case for use in electronic products, and a process for production thereof.

Means to Solve the Problem

As a result of extensive and intensive efforts made to solve the above problems, the inventors of the present invention have found that a flame-retardant resin composition composed of a polycarbonate resin containing a specific phosphorus-containing flame retardant is formed into a thin sheet or film while controlling its thickness uniformly, thereby resulting in a sheet or film excellent in flame retardancy and further having a good appearance with fewer color irregularities and high light-blocking properties.

As a result of further extensive and intensive efforts made to solve the above problems, the inventors of the present invention have also found that a highly flame-retardant thin sheet or film is processed into a box shape or a pocket shape to hold batteries therein, thereby resulting in a battery pack case excellent in flame retardancy.

More specifically, the present invention is as follows.

(1) A flame-retardant sheet or film having a thickness of 0.01 to 0.25 mm, which is molded from a polycarbonate resin composition containing, relative to 100 parts by mass of a polycarbonate resin, 7 to 30 parts by mass of a flame retardant comprising a specific phosphorus-containing flame retardant described later, wherein the thickness distribution at the time of sheet or film molding in the direction (TD) perpendicular to the direction of resin flow is controlled to be within ±10% of the average thickness.

(2) The flame-retardant sheet or film according to (1) above, wherein the polycarbonate resin composition further contains 12 parts by mass or less of one or more inorganic fillers, relative to 100 parts by mass of the polycarbonate resin.

(3) The flame-retardant sheet or film according to (1) or (2) above, wherein the polycarbonate resin composition contains carbon black, wherein the content of carbon black is 0.0001 to 10 parts by mass, relative to 100 parts by mass of the polycarbonate resin, and wherein the total light transmittance is 5% or less.

(4) The flame-retardant sheet or film according to any one of (1) to (3) above, wherein the polycarbonate resin composition further contains 1 part by mass or less of a fibril-forming fluoropolymer, relative to 100 parts by mass of the polycarbonate resin.

(5) The flame-retardant sheet or film according to any one of (1) to (4) above, wherein the polycarbonate resin composition further contains one or more stabilizers selected from the group consisting of antioxidants and UV absorbers.

(6) The flame-retardant sheet or film according to any one of (1) to (5) above, wherein a test piece of 0.01 to 0.25 mm thickness has a UL94 flame retardancy of VTM-0 or VTM-1.

(7) The flame-retardant sheet or film according to any one of (1) to (6) above, wherein the flame-retardant sheet or film is produced by extruding the polycarbonate resin composition into a sheet shape through an extruder and cooling the same with a chill roll.

(8) A battery pack case, which is configured such that the flame-retardant sheet or film according to any one of (1) to (7) above is processed into a box shape or a pocket shape to hold batteries therein.

(9) The battery pack case according to (8) above, wherein the flame-retardant sheet or film is stacked in two layers and processed into a pouch-like pocket shape by heat sealing or ultrasonic welding along the four sides to thereby allow batteries to be held therein.

(10) The battery pack case according to (8) above, wherein the flame-retardant sheet or film is folded and processed into a pouch-like pocket shape by heat sealing or ultrasonic welding along the three sides to thereby allow batteries to be held therein.

(11) The battery pack case according to (8) above, wherein the flame-retardant film is rolled into a cylindrical shape and sealed at the top and bottom ends with injection-molded lid members each consisting of the flame-retardant polycarbonate resin composition to thereby allow batteries to be held therein.

(12) The battery pack case according to (8) above, wherein the flame-retardant film is processed into a box shape by being subjected to film insert molding to form a frame consisting of the flame-retardant polycarbonate resin composition around the edges of the flame-retardant film to thereby allow batteries to be held therein.

(13) A battery pack, which comprises the battery pack case according to (8) above and batteries held therein.

Effects of the Invention

According to the present invention, it is possible to provide a molded article with fewer color irregularities and excellent in flame retardancy and flexibility when increasing the accuracy of thickness distribution in a specific TD direction in a sheet or film formed from a polycarbonate resin composition containing a specific phosphorus-containing flame retardant. Moreover, when further using a given amount of carbon black or the like, it is possible to provide a thin sheet or film molded article having higher flame retardancy and good light-blocking properties. Furthermore, the thin sheet or film of the present invention can be used as a packaging material for battery packs because of its good ultrasonic weldability.

DESCRIPTION OF EMBODIMENTS

The present invention will be further described in more detail below by way of the following embodiments and illustrations, although the present invention is not limited in any way by the following embodiments and illustrations and can be implemented with modifications as appropriate without departing from the spirit of the present invention. It should be noted that the expression " . . . to . . . " is used herein to mean that the numerical values appearing before and after the word "to" are included as lower and upper limits, respectively.

[1. Summary]

The polycarbonate resin composition for use in the present invention comprises at least a polycarbonate resin and a specific phosphorus-containing flame retardant, and results in a sheet or film excellent in flame retardancy and light-blocking properties when processed into a sheet or film of uniform thickness. Moreover, the flame-retardant sheet or film of the present invention may further contain other components, as needed.

The battery pack case of the present invention is produced as follows: the above polycarbonate resin composition is formed into a thin flame-retardant sheet or film having a thickness of 0.01 to 0.25 mm and processed into a box shape or a pocket shape to hold batteries therein. Moreover, the battery pack case of the present invention may further contain other components, as needed.

[2. Polycarbonate Resin]

There is no particular limitation on the type of polycarbonate resin for use in the polycarbonate resin composition of the present invention. In addition, a single type of polycarbonate resin may be used, or alternatively, two or more types of polycarbonate resins may be used in any combination and at any ratio.

It should be noted that the polycarbonate resins intended in the present invention are polymers with a skeletal structure having carbonate bonds, represented by the following formula (7).

[Formula 1]

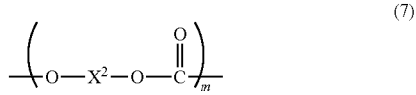
(7)

In formula (7), $X^2$ is generally a hydrocarbon, although $X^2$ may be modified to have a heteroatom or a heterobond for the purpose of imparting various properties.

Moreover, such polycarbonate resins may be classified into aromatic polycarbonate resins whose carbons each being directly linked to the carbonate bond are aromatic carbons, and aliphatic polycarbonate resins whose carbons each being directly linked to the carbonate bond are aliphatic carbons, although either of them may be used. Among them, aromatic polycarbonate resins are preferred in terms of heat resistance, mechanical properties, electrical properties and so on.

There is no particular limitation on how to prepare polycarbonate resins, and any process may be used for this purpose. Examples include the interfacial polymerization process (the phosgene process), the melt transesterification process, the pyridine process, the ring-opening polymerization process starting from cyclic carbonate compounds, the solid-phase transesterification process starting from prepolymers, etc.

Although there is no limitation on the actual type of polycarbonate resin, examples include polycarbonate polymers prepared by reaction between a dihydroxy compound and a carbonate precursor. In this case, a polyhydroxy compound or the like may be reacted, in addition to the dihydroxy compound and the carbonate precursor. Alternatively, carbon dioxide may be used as a carbonate precursor and reacted with a cyclic ether. Moreover, such polycarbonate polymers may be either linear or branched. Further, such polycarbonate polymers may be homopolymers consisting of a single type of repeating unit or may be copolymers having two or more types of repeating units. In this case, various modes of copolymerization may be selected to prepare copolymers, e.g., random copolymers, block copolymers and so on. It should be noted that the thus prepared polycarbonate polymers are generally thermoplastic resins.

Among monomers serving as starting materials for aromatic polycarbonate resins, aromatic dihydroxy compounds may be exemplified by:

dihydroxybenzenes such as 1,2-dihydroxybenzene, 1,3-dihydroxybenzene (i.e., resorcinol), 1,4-dihydroxybenzene, etc.;

dihydroxybiphenyls such as 2,5-dihydroxybiphenyl, 2,2'-dihydroxybiphenyl, 4,4'-dihydroxybiphenyl, etc.;

dihydroxynaphthalenes such as 2,2'-dihydroxy-1,1'-binaphthyl, 1,2-dihydroxynaphthalene, 1,3-dihydroxynaphthalene, 2,3-dihydroxynaphthalene, 1,6-dihydroxynaphthalene, 2,6-dihydroxynaphthalene, 1,7-dihydroxynaphthalene, 2,7-dihydroxynaphthalene, etc.;

dihydroxydiaryl ethers such as 2,2'-dihydroxydiphenyl ether, 3,3'-dihydroxydiphenyl ether, 4,4'-dihydroxydiphenyl ether, 4,4'-dihydroxy-3,3'-dimethyldiphenyl ether, 1,4-bis(3-hydroxyphenoxy)benzene, 1,3-bis(4-hydroxyphenoxy)benzene, etc.;

bis(hydroxyaryl)alkanes such as 2,2-bis(4-hydroxyphenyl)propane (i.e., bisphenol A), 1,1-bis(4-hydroxyphenyl)propane, 2,2-bis(3-methyl-4-hydroxyphenyl)propane, 2,2-bis(3-methoxy-4-hydroxyphenyl)propane, 2-(4-hydroxyphenyl)-2-(3-methoxy-4-hydroxyphenyl)propane, 1,1-bis(3-tert-butyl-4-hydroxyphenyl)propane, 2,2-bis(4-hydroxy-3,5-dimethylphenyl)propane, 2,2-bis(3-cyclohexyl-4-hydroxyphenyl)propane, 2-(4-hydroxyphenyl)-2-(3-cyclohexyl-4-hydroxyphenyl)propane, α,α"-bis(4-hydroxyphenyl)-1,4-diisopropylbenzene, 1,3-bis[2-(4-hydroxyphenyl)-2-propyl]benzene, bis(4-hydroxyphenyl)methane, bis(4-hydroxyphenyl)cyclohexylmethane, bis(4-hydroxyphenyl)phenylmethane, bis(4-hydroxyphenyl)(4-propenylphenyl)methane, bis(4-hydroxyphenyl)diphenylmethane, bis(4-hydroxyphenyl)naphthylmethane, 1-bis(4-hydroxyphenyl)ethane, 2-bis(4-hydroxyphenyl)ethane, 1,1-bis(4-hydroxyphenyl)-1-phenylethane, 1,1-bis(4-hydroxyphenyl)-1-naphthylethane, 1-bis(4-hydroxyphenyl)butane, 2-bis(4-hydroxyphenyl)butane, 2,2-bis(4-hydroxyphenyl)pentane, 1,1-bis(4-hydroxyphenyl)hexane, 2,2-bis(4-hydroxyphenyl)hexane, 1-bis(4-hydroxyphenyl)octane, 2-bis(4-hydroxyphenyl)octane, 1-bis(4-hydroxyphenyl)hexane, 2-bis(4-hydroxyphenyl)hexane, 4,4-bis(4-hydroxyphenyl)heptane, 2,2-bis(4-hydroxyphenyl)nonane, 10-bis(4-hydroxyphenyl)decane, 1-bis(4-hydroxyphenyl)dodecane, etc.;

bis(hydroxyaryl)cycloalkanes such as 1-bis(4-hydroxyphenyl)cyclopentane, 1-bis(4-hydroxyphenyl)cyclohexane, 4-bis(4-hydroxyphenyl)cyclohexane, 1,1-bis(4-hydroxyphenyl)-3,3-dimethylcyclohexane, 1-bis(4-hydroxyphenyl)-3,4-dimethylcyclohexane, 1,1-bis(4-hydroxyphenyl)-3,5-dimethylcyclohexane, 1,1-bis(4-hydroxyphenyl)-3,3,5-trimethylcyclohexane, 1,1-bis(4-hydroxy-3,5-dimethylphenyl)-3,3,5-trimethylcyclohexane, 1,1-bis(4-hydroxyphenyl)-3-propyl-5-methylcyclohexane, 1,1-bis(4-hydroxyphenyl)-3-tert-butyl-cyclohexane, 1,1-bis(4-hydroxyphenyl)-3-tert-butyl-cycohexane, 1,1-bis(4-hydroxyphenyl)-3-phenylcyclohexane, 1,1-bis(4-hydroxyphenyl)-4-phenylcyclohexane, etc.;

cardo structure-containing bisphenols such as 9,9-bis(4-hydroxyphenyl)fluorene, 9,9-bis(4-hydroxy-3-methylphenyl)fluorine, etc.;

dihydroxydiaryl sulfides such as 4,4'-dihydroxydiphenyl sulfide, 4,4'-dihydroxy-3,3'-dimethyldiphenyl sulfide, etc.;

dihydroxydiaryl sulfoxides such as 4,4'-dihydroxydiphenyl sulfoxide, 4,4'-dihydroxy-3,3'-dimethyldiphenyl sulfoxide, etc.; and dihydroxydiaryl sulfones such as 4,4'-dihydroxydiphenyl sulfone, 4,4'-dihydroxy-3,3'-dimethyldiphenyl sulfone, etc.

Among them, preferred are bis(hydroxyaryl)alkanes and more preferred are bis(4-hydroxyphenyl)alkanes. In particular, 2,2-bis(4-hydroxyphenyl)propane (i.e., bisphenol A) is preferred in terms of impact resistance and heat resistance.

It should be noted that these aromatic dihydroxy compounds may be used either alone or in any combination at any ratio.

Likewise, monomers serving as starting materials for aliphatic polycarbonate resins may be exemplified by:

alkanediols such as ethane-1,2-diol, propane-1,2-diol, propane-1,3-diol, 2,2-dimethylpropane-1,3-diol, 2-methyl-2-propylpropane-1,3-diol, butane-1,4-diol, pentane-1,5-diol, hexane-1,6-diol, decane-1,10-diol, etc.;

cycloalkanediols such as cyclopentane-1,2-diol, cyclohexane-1,2-diol, cyclohexane-1,4-diol, 1,4-cyclohexanedimethanol, 4-(2-hydroxyethyl)cyclohexanol, 2,2,4,4-tetramethyl-cyclobutane-1,3-diol, etc.;

glycols such as 2,2'-oxydiethanol (i.e., ethylene glycol), diethylene glycol, triethylene glycol, propylene glycol, spiroglycol, etc.;

aralkyldiols such as 1,2-benzenedimethanol, 1,3-benzenedimethanol, 1,4-benzenedimethanol, 1,4-benzenediethanol, 1,3-bis(2-hydroxyethoxy)benzene, 1,4-bis(2-hydroxyethoxy)benzene, 2,3-bis(hydroxymethyl)naphthalene, 1,6-bis(hydroxyethoxy)naphthalene, 4,4'-biphenyldimethanol, 4,4'-biphenyldiethanol, 1,4-bis(2-hydroxyethoxy)biphenyl, bisphenol A bis(2-hydroxyethyl)ether, bisphenol S bis(2-hydroxyethyl)ether, etc.; and cyclic ethers such as 1,2-epoxyethane (i.e., ethylene oxide), 1,2-epoxypropane (i.e., propylene oxide), 1,2-epoxycyclopentane, 1,2-epoxycyclohexane, 1,4-epoxycyclohexane, 1-methyl-1,2-epoxycyclohexane, 2,3-epoxynorbomane, 1,3-epoxypropane, etc. These monomers serving as starting materials for aliphatic polycarbonate resins may be used either alone or in any combination at any ratio.

Among monomers serving as starting materials for aromatic polycarbonate resins, those used as carbonate precursors may be exemplified by carbonyl halides, carbonate esters and so on. It should be noted that these carbonate precursors may be used either alone or in any combination at any ratio.

Carbonyl halides may be specifically exemplified by phosgene; haloformates such as bischloroformates of dihydroxy compounds, monochloroformates of dihydroxy compounds, etc.

Carbonate esters may be specifically exemplified by diaryl carbonates such as diphenyl carbonate, ditolyl carbonate, etc.; dialkyl carbonates such as dimethyl carbonate, diethyl carbonate, etc.; and carbonates of dihydroxy compounds such as biscarbonates of dihydroxy compounds, monocarbonates of dihydroxy compounds, cyclic carbonates, etc.

* Other Information about Polycarbonate Resins

The molecular weight of polycarbonate resins is not limited in any way and may be determined by being selected as appropriate, although the viscosity average molecular weight [Mv] calculated from the solution viscosity is generally 10000 or more, preferably 16000 or more, and more preferably 17000 or more, and is also generally 40000 or less, preferably 30000 or less, and more preferably 24000 or less. As a result of having a viscosity average molecular weight equal to or greater than the lower limit value of the above range, the polycarbonate resin composition of the present invention can further enhance its mechanical strength and is therefore more preferable for use in applications requiring high mechanical strength. On the other hand, as a result of having a viscosity average molecular weight equal to or less than the upper limit value of the above range, the polycarbonate resin composition of the present invention can be improved by being prevented from a reduction in its fluidity and is therefore easier to process by molding due to enhanced molding processability. It should be noted that two or more polycarbonate resins having different viscosity average molecular weights may be used in admixture. In this case, polycarbonate resins whose viscosity average molecular weight is outside the above preferred range may be mixed.

It should be noted that viscosity average molecular weight [Mv] is intended to mean a value calculated by the Schnell's viscosity equation, $\eta=1.23\times10^{-4}$ $Mv^{0.83}$ from a limiting viscosity [η] (unit: dl/g) at a temperature of 20° C., as determined with an Ubbelohde viscometer using methylene chloride as a solvent. The limiting viscosity [η] refers to a value calculated by the following equation from a specific viscosity [ηsp] measured at each solution concentration [C] (g/dl).

$$\eta = \lim_{c \to 0} \eta_{sp}/c \qquad \text{[Equation 1]}$$

The concentration of terminal hydroxyl groups in polycarbonate resins is not limited in any way and may be determined by being selected as appropriate, although it is generally 1000 ppm or less, preferably 600 ppm or less, and more preferably 300 ppm or less. As a result, the polycarbonate resin composition of the present invention can further improve its heat stability during retention and its color tone. As a result, the polycarbonate resin composition of the present invention can be prevented from a reduction in its molecular weight and therefore can further enhance its mechanical properties.

It should be noted that the concentration of terminal hydroxyl groups is expressed in units of ppm, calculated as the weight of terminal hydroxyl groups relative to the weight of the polycarbonate resin. The measurement is accomplished by colorimetry based on the titanium tetrachloride/acetic acid method (i.e., the method described in Macromol. Chem. 88 215(1965)).

Polycarbonate resins may be used alone (which is not limited to embodiments comprising only a single type of polycarbonate resin and is intended to also mean embodiments comprising several types of polycarbonate resins which mutually differ in their monomer composition and molecular weight, by way of example), or alternatively, alloys (mixtures) of polycarbonate resins and other thermoplastic resins may be used in combination. Moreover, polycarbonate resins may be configured as copolymers based mainly on polycarbonate resins, as exemplified by copolymers with oligomers or polymers having a siloxane structure with the aim of further improvement in flame retardancy and/or impact resistance; copolymers with monomers, oligomers or polymers having a phosphorus atom(s) with the aim of further improvement in thermal oxidative stability and/or flame retardancy; copolymers with monomers, oligomers or polymers having a dihydroxyanthraquinone structure with the aim of improvement in thermal oxidative stability; copolymers with oligomers or polymers having an olefinic structure (e.g., polystyrenes) with the aim of improvement in optical properties; copolymers with polyester resin oligomers or polymers with the aim of improvement in chemical resistance; and so on.

In addition, with the aim of improvement in the appearance of molded articles and improvement in fluidity, polycarbonate resins may contain polycarbonate oligomers. The viscosity average molecular weight [Mv] of such a polycarbonate oligomer is generally 1500 or more, preferably 2000 or more, and is also generally 9500 or less, preferably 9000 or less. Moreover, polycarbonate oligomers to be contained preferably constitute 30% by mass or less, more preferably 15% by mass or less of the polycarbonate resins (comprising the polycarbonate oligomers).

Further, polycarbonate resins are not limited only to virgin materials and may also be polycarbonate resins recycled from the used products (i.e., so-called material recycled polycarbonate resins). Examples of the above used products include optical storage media such as optical disks; light-guiding panels; transparent vehicle members such as automobile window glasses, automobile head lamp lenses, and windshields; containers such as water bottles; spectacles lenses; building components such as sound-proof walls, glass windows, corrugated panels, etc. Moreover, it is also possible to use scraps obtained from product rejects, sprues, runners and others, or pellets or the like obtained by melting such scraps.

However, recycled polycarbonate resins preferably constitute 80% by mass or less, particularly more preferably 50% by mass or less of the polycarbonate resin(s) contained in the polycarbonate resin composition of the present invention. This is because recycled polycarbonate resins are highly likely to suffer deterioration such as heat deterioration and/or long-term deterioration, which in turn may cause reductions in hue and mechanical properties when such a polycarbonate resin is used in an amount greater than the above range.

The polycarbonate resin composition of the present invention comprises a polycarbonate resin(s) as a major component, and the polycarbonate resin(s) preferably constitute 75% by mass or more, more preferably 80% by mass or more, even more preferably 85% by mass or more of the polycarbonate resin composition.

[3. Flame Retardant]

The polycarbonate resin composition of the present invention contains 7 to 30 parts by mass of a flame retardant, relative to 100 parts by mass of the polycarbonate resin(s). As a result of containing a flame retardant in such an amount, the polycarbonate resin composition of the present invention can improve its flame retardancy. The content of a flame retardant is more preferably 7 to 20 parts by mass, even more preferably 10 to 15 parts by mass, relative to 100 parts by mass of the polycarbonate resin(s).

In the present invention, a polycarbonate resin composition excellent in flame retardancy and fluidity is obtained when using a phosphorus-containing flame retardant as a flame retardant.

A phosphorus-containing flame retardant for use in the present invention is a compound containing phosphorus in its molecule, which may be a low molecular compound, an oligomer or a polymer. Particularly preferred examples include a condensed phosphate ester compound represented by formula (1), a cyclic phosphazene compound represented by formula (2) and a linear phosphazene compound represented by formula (3), in terms of heat stability:

[Formula 2]

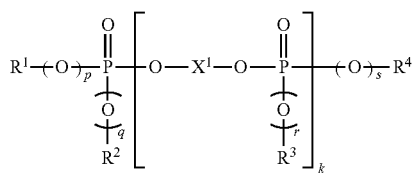

(1)

[in formula (1), $R^1$, $R^2$, $R^3$ and $R^4$ each represent an alkyl group containing 1 to 6 carbon atoms or an aryl group containing 6 to 20 carbon atoms which may be substituted with an alkyl group, p, q, r and s are each 0 or 1, k is an integer of 1 to 5, and $X^1$ represents an arylene group];

[Formula 3]

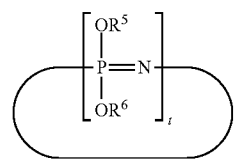

(2)

[in formula (2), t is an integer of 3 to 25, and $R^5$ and $R^6$, which may be the same or different, each represent an aryl group or an alkylaryl group]; and

[Formula 4]

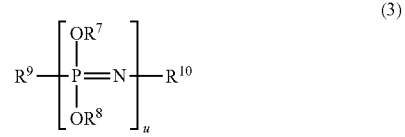

(3)

[in formula (3), u is an integer of 3 to 10,000, $R^9$ represents at least one selected from a —N=P(OR$^7$)$_3$ group, a —N=P(OR$^8$)$_3$ group, a —N=P(O)OR$^7$ group and a —N=P(O)OR$^8$ group, and $R^{10}$ represents at least one selected from a —P(OR$^7$)$_4$ group, a —P(OR$^8$)$_4$ group, a —P(O)(OR$^7$)$_2$ group and a —P(O)(OR$^8$)$_2$ group, wherein $R^7$ and $R^8$, which may be the same or different, each represent an aryl group or an alkylaryl group].

The above condensed phosphate ester compound represented by formula (1) may be a mixture of compounds having different numbers for k. In the case of such a mixture of condensed phosphate esters having different numbers for k, k is expressed as a mean thereof. k is generally an integer of 0 to 5, and in the case of a mixture of compounds having different numbers for k, the mean number of k is preferably in the range of 0.5 to 2, more preferably 0.6 to 1.5, even more preferably 0.8 to 1.2, and particularly preferably 0.95 to 1.15.

In addition, $X^1$ represents a divalent arylene group, as exemplified by divalent groups derived from dihydroxy compounds such as resorcinol, hydroquinone, bisphenol A, 2,2'-dihydroxybiphenyl, 2,3'-dihydroxybiphenyl, 2,4'-dihydroxybiphenyl, 3,3'-dihydroxybiphenyl, 3,4'-dihydroxybiphenyl, 4,4'-dihydroxybiphenyl, 1,2-dihydroxynaphthalene, 1,3-dihydroxynaphthalene, 1,4-dihydroxynaphthalene, 1,5-dihydroxynaphthalene, 1,6-dihydroxynaphthalene, 1,7-dihydroxynaphthalene, 1,8-dihydroxynaphthalene, 2,3-dihydroxynaphthalene, 2,6-dihydroxynaphthalene, 2,7-dihydroxynaphthalene and so on. Among them, particularly preferred are divalent groups derived from resorcinol, bisphenol A and 3,3'-dihydroxybiphenyl.

Moreover, p, q, r and s in formula (1) each represent 0 or 1, particularly preferably 1.

Moreover, $R^1$, $R^2$, $R^3$ and $R^4$ each represent an alkyl group containing 1 to 6 carbon atoms or an aryl group containing 6 to 20 carbon atoms which may be substituted with an alkyl group. Examples of such an aryl group include a phenyl group, a cresyl group, a xylyl group, an isopropylphenyl group, a butylphenyl group, a tert-butylphenyl group, a di-tert-butylphenyl group, a p-cumylphenyl group and so on, with a phenyl group, a cresyl group and a xylyl group being more preferred.

Specific examples of the phosphate ester compound represented by formula (1) include condensed phosphate esters such as resorcinol bis-diphenyl phosphate (RDP), resorcinol bis-dixylenyl phosphate (RDX), bisphenol A bis-diphenyl phosphate (BDP), biphenyl bis-diphenyl phosphate and so on.

The acid value of the phosphate ester compound represented by formula (1) is preferably 0.2 mg KOH/g or less, more preferably 0.15 mg KOH/g or less, even more preferably 0.1 mg KOH or less, and particularly preferably 0.05 mg KOH/g or less. The lower limit of this acid value may be set to substantially 0. On the other hand, the half ester content is more preferably 1.1 parts by mass or less, and even more preferably 0.9 parts by mass or less. If the acid value is greater than 0.2 mg KOH/g or if the half ester content is greater than 1.1 parts by mass, there arises a possibility of causing reductions in the heat stability and hydrolysis resistance of the polycarbonate resin composition of the present invention.

In addition to those listed above, other examples of phosphate ester compounds for use in the present invention include 10-(2,5-dihydroxyphenyl)-10H-9-oxa-10-phosphaphenanthrene-10-oxide, 10-(2,3-dihydroxyphenyl)-10H-9-oxa-10-phosphaphenanthrene-10-oxide, 10-(2,4-dihydroxyphenyl)-10H-9-oxa-10-phosphaphenanthrene-10-oxide, as well as polyester resins, polycarbonate resins and epoxy resins, each containing phosphate ester moieties, as a matter of course.

Moreover, as long as thermal decomposition at high temperatures can be prevented, it is also possible to use aromatic phosphate esters such as triphenyl phosphate (TPP), tricresyl phosphate (TCP), trixylenyl phosphate (TXP), cresyldiphenyl phosphate (CDP), 2-ethylhexyldiphenyl phosphate (EHDP), tert-butylphenyldiphenyl phosphate, bis-(tert-butylphenyl)phenyl phosphate, tris-(tert-butylphenyl) phosphate, isopropylphenyldiphenyl phosphate, bis-(isopropylphenyl)diphenyl phosphate, tris-(isopropylphenyl) phosphate and so on although they are not include in the above compound of formula (1).

The phosphazene compounds represented by formulae (2) and (3) may be exemplified by cyclic and/or linear $C_{1-6}$ alkyl $C_{6-20}$ aryloxyphosphazenes such as phenoxyphosphazene, (poly)tolyloxyphosphazenes (e.g., o-tolyloxyphosphazene, m-tolyloxyphosphazene, p-tolyloxyphosphazene, o,m-tolyloxyphosphazene, o,p-tolyloxyphosphazene, m,p-tolyloxyphosphazene, o,m,p-tolyloxyphosphazene) and (poly)xylyloxyphosphazenes, as well as cyclic and/or linear $C_{6-20}$ aryl $C_{1-10}$ alkyl $C_{6-20}$ aryloxyphosphazenes such as (poly)phenoxytolyloxyphosphazenes (e.g., phenoxy-o-tolyloxyphosphazene, phenoxy-m-tolyloxyphosphazene, phenoxy-p-tolyloxyphosphazene, phenoxy-o,m-tolyloxyphosphazene, phenoxy-o,p-tolyloxyphosphazene, phenoxy-m,p-tolyloxyphosphazene, phenoxy-o,m,p-tolyloxyphosphazene), (poly)phenoxyxylyloxyphosphazenes and (poly)phenoxytolyloxyxylyloxyphosphazenes, and preferred are cyclic and/or linear phenoxyphosphazenes, cyclic and/or linear $C_{1-3}$ alkyl $C_{6-20}$ aryloxyphosphazenes and $C_{6-20}$ aryloxy $C_{1-3}$ alkyl $C_{6-20}$ aryloxyphosphazenes (e.g., cyclic and/or linear tolyloxyphosphazenes, cyclic and/or linear phenoxytolylphenoxyphosphazenes).

In the cyclic phosphazene compound represented by formula (2), $R^5$ and $R^6$ may be the same or different and each represent an aryl group or an alkylaryl group. Examples of such an aryl group or alkylaryl group include a phenyl group, a naphthyl group, a methylphenyl group, a benzyl group and so on, although cyclic phenoxyphosphazenes in which $R^5$ and $R^6$ are each a phenyl group are particularly preferred. Such cyclic phenoxyphosphazene compounds may be exemplified by compounds such as phenoxycyclotriphosphazene, octaphenoxycyclotetraphosphazene, decaphenoxycyclopentaphosphazene and so on, which are obtained as follows: ammonium chloride and phosphorous pentachloride are reacted at a temperature of 120° C. to 130° C. to obtain a mixture of cyclic and linear chlorophosphazenes, from which cyclic chlorophosphazenes such as hexachlorocyclotriphosphazene, octachlorocyclotetraphosphazene, decachlorocyclopentaphosphazene and so on are then collected and substituted with phenoxy groups.

Moreover, in formula (2), t represents an integer of 3 to 25. Particularly preferred are compounds in which t is an integer of 3 to 8, and a mixture of compounds having different numbers for t may also be possible. Particularly preferred is a mixture comprising 50% by mass or more of compounds in which t=3, 10% to 40% by mass of compounds in which t=4, and 30% by mass or less of compounds in which t=5 or greater.

In formula (3), $R^7$ and $R^8$ may be the same or different and each represent an aryl group or an alkylaryl group. Examples of such an aryl group or alkylaryl group include a phenyl group, a naphthyl group, a methylphenyl group, a benzyl group and so on, although linear phenoxyphosphazenes in which $R^7$ and $R^8$ are each a phenyl group are particularly preferred. Such linear phenoxyphosphazene compounds may be exemplified by compounds obtained as follows: hexachlorocyclotriphosphazene obtained as described above is subjected to ring-opening polymerization at a temperature of 220° C. to 250° C. to obtain linear dichlorophosphazene having a polymerization degree of 3 to 10,000, which is then substituted with phenoxy groups.

In addition, $R^9$ represents at least one selected from a $—N=P(OR^7)_3$ group, a $—N=P(OR^8)_3$ group, a $—N=P(O)OR^7$ group and a $—N=P(O)OR^8$ group, and $R^{10}$ represents at least one selected from a $—P(OR^7)_4$ group, a $—P(OR^8)_4$ group, a $—P(O)(OR^7)_2$ group and a $—P(O)(OR^8)_2$ group.

Moreover, in formula (3), u represents an integer of 3 to 10,000, preferably 3 to 1000, more preferably 3 to 100, and even more preferably 3 to 25.

Furthermore, phosphazene compounds for use in the present invention may comprise bridged phosphazene compounds as a part thereof. The presence of such a bridged structure tends to increase heat resistance. Examples of such bridged phosphazene compounds include compounds having a bridged structure composed of a 4,4'-diphenylene group, as exemplified by compounds having a bridged structure composed of 4,4'-sulfonyldiphenylene (bisphenol S residue), compounds having a bridged structure composed of a 2,2-(4,4'-diphenylene)isopropylidene group, compounds having a bridged structure composed of a 4,4'-oxydiphenylene group, and compounds having a bridged structure composed of a 4,4'-thiodiphenylene group:

[Formula 5]

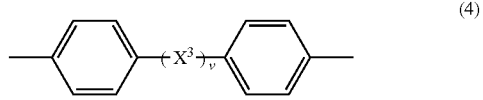

(4)

[in formula (4), $X^3$ is $—C(CH_3)_2—$, $—SO_2—$, $—S—$ or $—O—$, and v is 0 or 1].

Bridged phosphazene compounds preferred in terms of flame retardancy are bridged phenoxyphosphazene compounds in which cyclic phenoxyphosphazene compounds of formula (2) wherein $R^5$ and $R^6$ are each a phenyl group are bridged via a bridging group represented by the above formula (4), or alternatively, bridged phenoxyphosphazene compounds in which linear phenoxyphosphazene compounds of the above formula (3) wherein $R^7$ and $R^8$ are each a phenyl group are bridged via a bridging group represented by the above formula (4), and more preferred are bridged phenoxyphosphazene compounds in which cyclic phenoxyphosphazene compounds are bridged via a bridging group represented by the above formula (4).

Moreover, the content of phenylene groups in bridged phenoxyphosphazene compounds is generally 50% to 99.9%, preferably 70% to 90%, based on the total number of phenyl and phenylene groups in cyclic phosphazene compounds represented by formula (2) and/or linear phenoxyphosphazene compounds represented by formula (3). In addition, these bridged phenoxyphosphazene compounds are particularly preferably those having no free hydroxyl group in their molecule.

In the present invention, preferred phosphazene compounds are at least one selected from the group consisting of bridged phenoxyphosphazene compounds in which cyclic phenoxyphosphazene compounds represented by the above formula (2) are bridged via a bridging group and in which linear phenoxyphosphazene compounds represented by the above formula (3) are bridged via a bridging group, in terms of flame retardancy and mechanical properties.

The content of such a phosphorus-containing flame retardant is 7 parts by mass or more, more preferably 10 parts by mass or more, and is 40 parts by mass or less, preferably 30 parts by mass or less, more preferably 20 parts by mass or less, even more preferably 15 parts by mass or less, relative to 100 parts by mass of the polycarbonate resin(s). If the content of the phosphorus-containing flame retardant is less than 1 part by mass, sufficient flame retardancy cannot be obtained. On the other hand, if the content of the phosphorus-containing flame retardant is greater than 40 parts by mass, there arises a possibility of causing a significant reduction in heat resistance and reductions in mechanical properties, and it is also economically unfavorable.

In the present invention, it is preferable to use only a phosphorus compound (phosphorus-containing flame retardant) as a flame retardant. Namely, the polycarbonate resin composition of the present invention preferably comprises a phosphorus compound (phosphorus-containing flame retardant) in an amount of 7 to 30 parts by mass, more preferably 7 to 20 parts by mass, even more preferably 10 to 15 parts by mass, relative to 100 parts by mass of the polycarbonate resin(s). However, the phosphorus-containing flame retardant may be used in combination with, e.g., other flame retardants and/or flame retardant aids as shown below, as long as they do not impair the effect of the present invention. Such flame retardants or flame retardant aids include inorganic flame retardants typified by antimony trioxide, zinc borate and magnesium hydroxide, melamine-based flame retardants typified by melamine cyanurate, organic sulfonic acid metal salt-based flame retardants typified by potassium perfluorobutanesulfonate and magnesium paratoluenesulfonate, as well as silicone-based flame retardants typified by organopolysiloxanes.

[4. Fluoropolymer]

The polycarbonate resin composition of the present invention may contain 0.001 to 1 part by mass of a fluoropolymer, relative to 100 parts by mass of the polycarbonate resin(s). There is no limitation on the type of fluoropolymer. In addition, a single type of fluoropolymer may be used, or alternatively, two or more types of fluoropolymers may be used in any combination and at any ratio.

Such fluoropolymers may be exemplified by polyfluoroolefin resins. Polyfluoroolefin resins generally refer to polymers or copolymers containing a fluoroethylene structure. Specific examples include polydifluoroethylene resins, polytetrafluoro ethyl ene resins, poly(tetrafluoroethylene/hexafluoropropylene) copolymer resins, polytetrafluoroethylene/perfluoroalkyl vinyl ether copolymer resins and so on. Particularly preferred examples include tetrafluoroethylene resins and so on. Among these polyfluoroethylene resins, fibril-forming polyfluoroethylene resins are given as examples.

Fibril-forming fluoroethylene resins may be exemplified by "Teflon® 6J" and "Teflon® 640J" (Du Pont-Mitsui Fluorochemicals Company, Ltd., Japan), as well as "Polyflon F201L," "Polyflon F103" and "Polyflon FA500B" (Daikin Industries, Ltd., Japan), etc. In addition, commercially available aqueous dispersions of fluoroethylene resins may be exemplified by "Teflon® 30J" and "Teflon® 31-JR" (Du Pont-Mitsui Fluorochemicals Company, Ltd., Japan), as well as "Fluon D-1" (Daikin Industries, Ltd., Japan), etc. Further, it is also possible to use multi-layer structured fluoroethylene polymers polymerized with vinyl monomers, and such fluoroethylene polymers include polystyrene-fluoroethylene complexes, polystyrene-acrylonitrile-fluoroethylene complexes, polymethyl methacrylate-fluoroethylene complexes, polybutyl methacrylate-fluoroethylene complexes and so on. Specific examples include "Metablen A-3800" (Mitsubishi Rayon Co., Ltd., Japan), "Blendex 449" (GE Specialty Chemical) and so on. It should be noted that these drip retardants may be used either alone or in any combination at any ratio.

The content of such a fluoropolymer(s) is generally 0.001 parts by mass or more, preferably 0.01 parts by mass or more, more preferably 0.05 parts by mass or more, particularly preferably 0.1 parts by mass or more, and is generally 1 part by mass or less, preferably 0.75 parts by mass or less, relative to 100 parts by mass of the polycarbonate resin(s). If the content of the fluoropolymer(s) is less than the lower limit value of the above range, the fluoropolymer-induced improving effect on flame retardancy may not be sufficiently high. On the other hand, if the content of the fluoropolymer(s) is greater than the upper limit value of the above range, molded articles formed from the polycarbonate resin composition may have a poor appearance and/or reduced mechanical strength.

[5. Stabilizer]

The polycarbonate resin composition of the present invention may contain a stabilizer. The content of a stabilizer is generally 0.001 parts by mass or more, preferably 0.01 parts by mass or more, and is generally 1 part by mass or less, preferably 0.5 parts by mass or less, relative to 100 parts by mass of the polycarbonate resin component or relative to 100 parts by mass of the polycarbonate resin(s).

For use as a stabilizer, one or more members may be selected from antioxidants and UV absorbers. Preferred examples include phosphorus-based stabilizers and phenol-based stabilizers, each serving as an antioxidant, and it is also possible to use UV absorbers such as benzotriazole-based and triazine-based UV absorbers, preferably benzotriazole-based UV absorbers, etc. Details will be described below.

[5-1. Phosphorus-based Stabilizer]

The polycarbonate resin composition of the present invention preferably contains a phosphorus-based stabilizer, as needed. As a result of containing a phosphorus-based stabilizer, the polycarbonate resin composition of the present invention has a good hue and further has improved color fastness and continuous productivity.

Any known phosphorus-based stabilizer may be used for this purpose. Specific examples include oxoacids of phosphorus (e.g., phosphoric acid, phosphonic acid, phosphorous acid, phosphinic acid, polyphosphoric acid); acidic pyrophosphoric acid metal salts (e.g., acidic sodium pyrophosphate, acidic potassium pyrophosphate, acidic calcium pyrophosphate); phosphoric acid salts of Group 1 or Group 2B metals (e.g., potassium phosphate, sodium phosphate, cesium phosphate, zinc phosphate); phosphate compounds, phosphite compounds, phosphonite compounds and so on, with phosphite compounds being particularly preferred. The selection of such a phosphite compound results in a polycarbonate resin composition with higher color fastness and continuous productivity.

In this regard, a phosphite compound is a trivalent phosphorus compound represented by the general formula $P(OR)^3$, wherein R represents a monovalent or divalent organic group. Examples of such a phosphite compound include triphenyl phosphite, tris(monononylphenyl) phosphite, tris(mononyl/dinonylphenyl) phosphite, tris(2,4-di-tert-butylphenyl) phosphite, monooctyldiphenyl phosphite, dioctylmonophenyl phosphite, monodecyldiphenyl phosphite, didecylmonophenyl phosphite, tridecyl phosphite, trilauryl phosphite, tristearyl phosphite, distearyl pentaerythritol diphosphite, bis(2,4-di-tert-butyl-4-methylphenyl) pentaerythritol phosphite, bis(2,6-di-tert-butylphenyl)octyl phosphite, 2,2-methylenebis(4,6-di-tert-butylphenyl)octyl phosphite, tetrakis(2,4-di-tert-butylphenyl)-4,4'-biphenylene-diphosphite, 6-[3-(3-tert-butyl-hydroxy-5-methylphenyl)propoxy]-2,4,8,10-tetra-tert-butyldibenzo[d,f][1,3,2]-dioxaphosphepin and so on.

Among these phosphite compounds, aromatic phosphite compounds represented by the following formulae (5) and/or (6) are more preferred because the color fastness of the polycarbonate resin composition of the present invention is enhanced effectively:

[Formula 6]

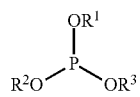

(5)

[in formula (5), $R^1$, $R^2$ and $R^3$ each represent an aryl group containing 6 or more and 30 or less carbon atoms, provided that $R^1$, $R^2$ and $R^3$ may be the same or different from each other]; and

[Formula 7]

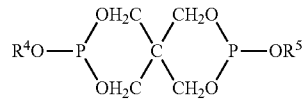

(6)

[in formula (6), $R^4$ and $R^5$ each represent an aryl group containing 6 or more and 30 or less carbon atoms, provided that $R^4$ and $R_5$ may be the same or different from each other].

Among phosphite compounds represented by the above formula (5), preferred are triphenyl phosphite, tris(monononylphenyl) phosphite, tris(2,4-di-tert-butylphenyl) phosphite and the like, and more preferred is tris(2,4-di-tert-butylphenyl) phosphite. Such organic phosphite compounds may be specifically exemplified by "Adekastab 1178" (ADEKA Corporation, Japan), "Sumilizer TNP" (Sumitomo Chemical Co., Ltd., Japan), "JP-351" (Johoku Chemical Co., Ltd., Japan), "Adekastab 2112" (ADEKA Corporation, Japan), "Irgafos 168" (Ciba Specialty Chemicals Inc., Japan), "JP-650" (Johoku Chemical Co., Ltd., Japan), etc.

Among phosphite compounds represented by the above formula (6), more preferred are bis(2,4-di-tert-butyl-4-methylphenyl)pentaerythritol phosphite and bis(2,6-di-tert-butylphenyl)octyl phosphite. Such organic phosphite compounds may be specifically exemplified by "Adekastab PEP-24G" and "Adekastab PEP-36" (ADEKA Corporation, Japan), etc.

It should be noted that these phosphorus-based stabilizers may be used either alone or in any combination at any ratio.

The content of such a phosphorus-based stabilizer(s) is generally 0.001 parts by mass or more, preferably 0.01 parts by mass or more, more preferably 0.03 parts by mass or more, and is generally 0.5 parts by mass or less, preferably 0.3 parts by mass or less, more preferably 0.1 parts by mass or less, relative to 100 parts by mass of the polycarbonate resin(s). If the content of the phosphorus-based stabilizer(s) is less than the lower limit value of the above range, the resulting polycarbonate resin composition may be insufficient in hue, color fastness and continuous productivity. On the other hand, if the content of the phosphorus-based stabilizer(s) is greater than the upper limit value of the above range, it is not favorable not only because color fastness becomes poorer, but also because heat and moisture stability tends to decrease.

[5-2. Phenol-based Stabilizer]

Phenol-based stabilizers may be exemplified by hindered phenol-based antioxidants. Specific examples include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene bis[3-(3,5-di-tert-butyl-4-hydroxyphenyl)propionate], N,N'-hexane-1,6-diylbis[3-(3,5-di-tert-butyl-4-hydroxyphenylpropionamide), 2,4-dimethyl-6-(1-methylpentadecyl)phenol, diethyl [[3,5-bis(1,1-dimethylethyl)-4-hydroxyphenyl]methyl]phosphonate, 3,3',3",5,5',5"-hexa-tert-butyl-a,a',a"-(mesitylene-2,4,6-triyl)tri-p-cresol, 4,6-bis(octylthiomethyl)-o-cresol, ethylenebis(oxyethylene) bis[3-(5-tert-butyl-4-hydroxy-m-tolyl)propionate], hexamethylene bis[3-(3,5-di-tert-butyl-4-hydroxyphenyl)propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazin-2-ylamino) phenol, 2-[1-(2-hydroxy-3,5-di-tert-pentylphenyl)ethyl]-4,6-di-tert-pentylphenylacrylate and so on.

Among them, preferred are pentaerythritol tetrakis[3-(3,5-di-tert-butyl-4-hydroxyphenyl)propionate] and octadecyl-3-(3,5-di-tert-butyl-4-hydroxyphenyl)propionate. Such phenol-based antioxidants may be specifically exemplified by "Irganox 1010" and "Irganox 1076" (BASF), "Adekastab AO-50" and "Adekastab AO-60" (ADEKA Corporation, Japan), etc.

It should be noted that these phenol-based stabilizers may be used either alone or in any combination at any ratio.

The content of such a phenol-based stabilizer(s) is generally 0.001 parts by mass or more, preferably 0.01 parts by mass or more, and is generally 1 part by mass or less, preferably 0.5 parts by mass or less, relative to 100 parts by mass of the polycarbonate resin(s). If the content of the phenol-based stabilizer(s) is less than the lower limit value of the above range, the effect as a phenol-based stabilizer may not be sufficiently high. On the other hand, if the content of the phenol-based stabilizer(s) is greater than the upper limit value of the above range, the effect reaches a maximum, which may not be economical.

[5-3. UV Absorber]

Examples of UV absorbers include inorganic UV absorbers (e.g., cerium oxide, zinc oxide); and organic UV absorbers (e.g., benzotriazole compounds, benzophenone compounds, salicylate compounds, cyanoacrylate compounds, triazine compounds, oxanilide compounds, malonic acid ester compounds, hindered amine compounds). Among them, preferred are organic UV absorbers, and more preferred are benzotriazole compounds. The selection of such an organic UV absorber results in good transparency and good mechanical properties for the polycarbonate resin composition of the present invention.

Specific examples of benzotriazole compounds include 2-(2'-hydroxy-5'-methylphenyl)benzotriazole, 2-[2'-hydroxy-3,5'-bis(α,α-dimethylbenzyl)phenyl]-benzotriazole, 2-(2'-hydroxy-3',5'-di-tert-butyl-phenyl)-benzotriazole, 2-(2-hydroxy-3-tert-butyl-5-methylphenyl)-5-chlorobenzotriazole, 2-(2'-hydroxy-3',5'-di-tert-butyl-phenyl)-5-chlorobenzotriazole), 2-(2'-hydroxy-3',5'-di-tert-amyl)-benzotriazole, 2-(2'-hydroxy-5'-tert-octylphenyl)benzotriazole, 2,2'-methylenebis[4-(1,1,3,3-tetramethylbutyl)-6-(2N-benzotriazol-2-yl)phenol] and so on. Among them, preferred are 2-(2'-hydroxy-5'-tert-octylphenyl)benzotriazole and 2,2'-methylenebis[4-(1,1,3,3-tetramethylbutyl)-6-(2N-benzotriazol-2-yl)phenol], and particularly preferred is 2-(2'-hydroxy-5'-tert-octylphenyl)benzotriazole. Such benzotriazole compounds may be specifically exemplified by "Seesorb 701," "Seesorb 705," "Seesorb 703," "Seesorb 702," "Seesorb 704" and "Seesorb 709" (Shipro Kasei Kaisha Ltd., Japan), "Biosorb 520," "Biosorb 582," "Biosorb 580" and "Biosorb 583" (Kyodo Chemical Co., Ltd., Japan), "Kemisorb 71" and "Kemisorb 72" (Chemipro Kasei Kaisha, Ltd., Japan), "Cyasorb UV5411" (Cytec Industries Inc.), "LA-32," "LA-38," "LA-36," "LA-34" and "LA-31" (ADEKA Corporation, Japan), "Tinuvin P," "Tinuvin 234," "Tinuvin 326," "Tinuvin 327" and "Tinuvin 328" (BASF), etc.

Specific examples of benzophenone compounds include 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-n-dodecyloxybenzophenone, bis(5-benzoyl-4-hydroxy-2-methoxyphenyl)methane, 2,2'-dihydroxy-4-methoxybenzophenone, 2,2'-dihydroxy-4,4'-dimethoxybenzophenone and so on. Such benzophenone compounds may be specifically exemplified by "Seesorb 100", "Seesorb 101," "Seesorb 101S," "Seesorb 102" and "Seesorb 103" (Shipro Kasei Kaisha Ltd., Japan), "Biosorb 100," "Biosorb 110" and "Biosorb 130" (Kyodo Chemical Co., Ltd., Japan), "Kemisorb 10," "Kemisorb 11," "Kemisorb 11S," "Kemisorb 12," "Kemisorb 13" and "Kemisorb 111" (Chemipro Kasei Kaisha, Ltd., Japan), "Uvinul 400" (BASF), "Uvinul M-40" (BASF), "Uvinul MS-40" (BASF), "Cyasorb UV9," "Cyasorb UV284," "Cyasorb UV531" and "Cyasorb UV24" (Cytec Industries Inc.), "Adekastab 1413" and "Adekastab LA-51" (ADEKA Corporation, Japan), etc.

Specific examples of salicylate compounds include phenyl salicylate, 4-tert-butylphenyl salicylate and so on. Such salicylate compounds may be specifically exemplified by "Seesorb 201" and "Seesorb 202" (Shipro Kasei Kaisha Ltd., Japan), "Kemisorb 21" and "Kemisorb 22" (Chemipro Kasei Kaisha, Ltd., Japan), etc.

Specific examples of cyanoacrylate compounds include ethyl-2-cyano-3,3-diphenylacrylate, 2-ethylhexyl-2-cyano-3,3-diphenylacrylate and so on. Such cyanoacrylate compounds may be specifically exemplified by "Seesorb 501" (Shipro Kasei Kaisha Ltd., Japan), "Biosorb 910" (Kyodo Chemical Co., Ltd., Japan), "Yubisoreta 300" (Daiichi Kasei Co., Ltd., Japan), "Uvinul N-35" and "Uvinul N-539" (BASF), etc.

Examples of triazine compounds include compounds having a 1,3,5-triazine skeleton. Such triazine compounds may be specifically exemplified by "LA-46" (ADEKA Corporation, Japan), "Tinuvin 1577ED," "Tinuvin 400," "Tinuvin 405," "Tinuvin 460," "Tinuvin 477-DW" and "Tinuvin 479" (BASF), etc.

Specific examples of oxanilide compounds include 2-ethoxy-2'-ethyloxanilic acid bisanilide and so on. Such oxanilide compounds may be specifically exemplified by "Sanduvor VSU" (Clariant), etc.

For use as malonic acid ester compounds, 2-(alkylidene) malonic acid esters are preferred and 2-(1-arylalkylidene) malonic acid esters are more preferred. Such malonic acid ester compounds may be specifically exemplified by "PR-25" and "Sanduvor B-CAP" (Clariant Japan), etc.

The content of such a UV absorber is generally 0.01 parts by mass or more, preferably 0.1 parts by mass or more, and is generally 3 parts by mass or less, preferably 1 part by mass or less, relative to 100 parts by mass of the polycarbonate resin(s). If the content of the UV absorber is less than the lower limit value of the above range, the improving effect on weather resistance may not be sufficiently high. On the other hand, if the content of the UV absorber is greater than the upper limit value of the above range, mold deposits or the like may occur to cause die contamination. It should be noted that the above UV absorbers may be used either alone or in any combination at any ratio.

[6. Inorganic Filler]

Moreover, in the present invention, the polycarbonate resin composition may contain an inorganic filler with the main aim of further improvement in flame retardancy and/or mechanical strength.

Examples of an inorganic filler include oxides of silicon (Si), aluminum (Al), titanium (Ti), zirconium (Zr), zinc (Zn) and magnesium (Mg), or any mixtures of these oxides. More specifically, various inorganic compounds and oxides may be exemplified by nonfibrous reinforcing agents such as zeolite, silica, kaolin clay, talc, wollastonite, titanium oxide, glass beads, glass flakes, aluminum hydroxide, aluminum oxide, silicon oxide, titanium oxide, silicon carbide, silicon nitride, calcium carbonate, barium carbonate, calcium sulfate, barium sulfate, calcium silicate, magnesium silicate, potassium titanate, aluminum borate, magnesium borate and so on, as well as fibrous reinforcing agents such as carbon fibers, silica fibers, alumina fibers, glass fibers, quartz fibers and so on. These materials may be coated with organic or inorganic substances, and preferred are those having affinity, compatibility or reactivity with the shape-retaining polymers mentioned above. Moreover, porous materials may be used as fillers, as described above. Particularly in the present invention, the use of talc ensures good surface smoothness and allows further improvement in flame retardancy due to its large extinguishing effect on molten resins upon burning, when compared to the other fillers.

Talc is not limited in any way, but preferably has a number average particle size of 1.0 to 9.0 μm, more preferably 1.5 to 8.0 μm, and even more preferably 2.0 to 7.0 μm, as measured by the sedimentation method (Asada method) using a light transmission-type particle size distribution analyzer. Talc whose number average particle size is less than 1.0 μm may not achieve sufficient flame retardancy, while talc whose number average particle size is greater than 9.0 μm may cause a reduction in the appearance of the resulting molded articles.

The content of Fe and Al components in talc is preferably 0.001% to 0.4% by weight, more preferably 0.001% to 0.2% by weight, when calculated as $Fe_2O_3$ and $Al_2O_3$, respectively. Moreover, in terms of impact resistance, talc whose surface has not been treated is more preferred for use.

The content of such an inorganic filler is generally 1 part by mass or more, preferably 3 parts by mass or more, and is generally 12 parts by mass or less, preferably 5 parts by mass or less, relative to 100 parts by mass of the polycarbonate resin(s). If the content of the inorganic filler is less than the lower limit value, the improving effect on flammability may not be sufficiently high. On the other hand, if the content of the inorganic filler is greater than the upper limit value of the above range, the resin content is reduced, which may cause a reduction in ultrasonic weldability.

[7. Carbon Black]

In the present invention, carbon black may be used with the aim of enhancing light-blocking properties and flame retardancy, although there is no limitation on the process for preparation thereof and the type of starting material thereof, etc. It is possible to use any conventionally known material, e.g., oil furnace black, channel black, acetylene black, ketjen black or the like. Among them, oil furnace black is preferred in terms of coloring power and costs. For example, Mitsubishi Carbon Black #1000 (Mitsubishi Chemical Corporation, Japan) or the like may be used for this purpose.

The average particle size of carbon black for use in the present invention may be determined by being selected as appropriate, although it is preferably 5 to 60 nm, more preferably 7 to 55 nm, and particularly preferably 10 to 50 nm. As a result of having an average particle size within the above range, carbon black is prevented from aggregation, so that the appearance tends to improve. It should be noted that the average particle size of carbon black may be determined using a transmission electron microscope.

The nitrogen adsorption specific surface area of carbon black for use in the present invention is generally preferably less than 1000 $m^2/g$, and particularly preferably 50 to 400 $m^2/g$. A nitrogen adsorption specific surface area of less than 1000 $m^2/g$ is favorable because there can be seen tendencies to improve the fluidity of the polycarbonate resin composition of the present invention and to improve the appearance of the resulting molded articles. It should be noted that the nitrogen adsorption specific surface area may be measured in accordance with JIS K6217 (unit: $m^2/g$).

Likewise, the DBP absorption of carbon black is preferably 300 $cm^3/100$ g or less, and particularly preferably 30 to 200 $cm^3/100$ g. A DBP absorption of less than 300 $cm^3/100$ g is favorable because there can be seen tendencies to improve the fluidity of the polycarbonate resin composition of the present invention and to improve the appearance of the resulting molded articles.

It should be noted that the DBP absorption may be measured in accordance with JIS K6217 (unit: $cm^3/100$ g). Moreover, carbon black for use in the present invention has no particular limitation on its pH, but generally has a pH of 2 to 10, preferably 3 to 9, and more preferably 4 to 8, in terms of its influence on the heat stability of polycarbonates.

In the present invention, it is possible to use a single type of carbon black or a combination of two or more types of carbon black. Further, carbon black may also be granulated with a binder or may be used as a master batch by being incorporated at high concentration into an additional resin through melt kneading. The use of a melt-kneaded master batch achieves improvements in handling during extrusion and in dispersibility into a resin composition. Examples of such an additional resin include polystyrene-based resins, polycarbonate-based resins, acryl-based resins and so on.

The content of carbon black is generally 0.0001 parts by mass or more, preferably 0.0005 parts by mass or more, more preferably 0.001 parts by mass or more, even more preferably 0.05 parts by mass or more, particularly preferably 0.5 parts by mass or more, and is generally 10 parts by mass or less, preferably 5 parts by mass or less, more preferably 2 parts by mass or less, even more preferably 1 part by mass or less, relative to 100 parts by mass of the polycarbonate resin(s). If the content of carbon black is less than the lower limit value of the above range, the resulting polycarbonate resin composition may have poor light-blocking properties. On the other hand, if the content of carbon black is greater than the upper limit value of the above range, the polycarbonate resin composition of the present invention may have reduced heat stability.

[8. Other Components]

The polycarbonate resin composition of the present invention may optionally contain other components in addition to those described above, as long as the desired various properties are not impaired significantly. For example, the polycarbonate resin composition of the present invention may contain a core/shell type elastomer serving as an impact strength modifier, and may further contain other components. Examples of other components include non-polycarbonate resins, various resin additives and so on. It should be noted that these other components may be used either alone or in any combination at any ratio.

* Non-polycarbonate Resins

Examples of non-polycarbonate resins include thermoplastic polyester resins (e.g., polyethylene terephthalate resins, polytrimethylene terephthalate, polybutylene terephthalate resins); styrene-based resins (e.g., polystyrene resins, high impact polystyrene (HIPS) resins, acrylonitrile-styrene copolymers (AS resins), acrylonitrile-styrene-acrylic rubber copolymers (ASA resins), acrylonitrile-ethylenepropylene-based rubber-styrene copolymers (AES resins)); polyolefin resins (e.g., polyethylene resins, polypropylene resins); polyamide resins; polyimide resins; polyetherimide resins; polyurethane resins; polyphenylene ether resins; polyphenylene sulfide resins; polysulfone resins; polymethacrylate resins, etc. These resins preferably constitute 30% by mass or less, more preferably 20% by mass or less of the polycarbonate resin composition.

It should be noted that these other resins may be used either alone or in any combination at any ratio.

* *Resin Additives

Examples of resin additives include dyes and pigments, antistatic agents, antifogging agents, antiblocking agents, fluidity modifiers, plasticizers, dispersants, antibacterial agents, mold release agents, impact strength modifiers and so on. It should be noted that these resin additives may be used either alone or in any combination at any ratio.

Examples of additives preferred for use in the polycarbonate resin composition of the present invention will be described in more detail below.

* * * Dyes and Pigments

The polycarbonate resin composition of the present invention may contain titanium oxide as an inorganic pigment. Dyes and pigments other than titanium oxide may be exemplified by inorganic pigments, organic pigments, organic dyes and so on. Examples of inorganic pigments include sulfide-based pigments (e.g., cadmium red, cadmium yellow); silicate-based pigments (e.g., ultramarine blue); oxide-based pigments (e.g., titanium oxide, zinc white, red iron oxide, chromium oxide, iron black, titan yellow, zinc-iron brown, titan cobalt green, cobalt green, cobalt blue, copper-chrome black, copper-iron black); chromate-based pigments (e.g., chrome yellow, molybdate orange); ferrocyanide-based pigments (e.g., iron blue), etc.

Examples of organic pigments and organic dyes include phthalocyanine-based dyes and pigments (e.g., copper phthalocyanine blue, copper phthalocyanine green); azo-based dyes and pigments (e.g., nickel azo yellow); condensed polycyclic dyes and pigments (e.g., thioindigo-based, perinone-based, perylene-based, quinacridone-based, dioxazine-based, isoindolinone-based and quinophthalone-based dyes and pigments); as well as anthraquinone-based, heterocyclic-based and methyl-based dyes and pigments, etc.

Among them, titanium oxide, cyanine-based, quinoline-based, anthraquinone-based or phthalocyanine-based compounds or the like are preferred in terms of heat stability. It should be noted that these dyes and pigments may be used either alone or in any combination at any ratio.

The content of such a dye(s) and/or pigment(s) is generally 5 parts by mass or less, preferably 3 parts by mass or less, and more preferably 2 parts by mass or less, relative to 100 parts by mass of the polycarbonate resin(s). If the content of the dye(s) and/or pigment(s) is too high, sufficient impact resistance cannot be achieved and/or roll contamination may be caused.

* * * * Impact Modifiers

The polycarbonate resin composition of the present invention may comprise an impact modifier. Examples of an impact strength modifier include multi-layer structured polymers whose inner core serving as a rubber component is composed of a polybutadiene-based polymer or a silicone rubber-based polymer, and whose outermost shell layer is composed of a thermoplastic resin layer adhesive to polycarbonate. By way of example, such polymers are those prepared by continuous multi-stage seed polymerization such that a polymer prepared in the preceding stage is covered sequentially with polymers to be prepared in the succeeding stages. Polybutadiene-based polymers are intended to include not only homopolymers of butadiene, but also copolymers of butadiene and a monomer(s) copolymerizable therewith, as well as those which are cross-linked. Moreover, their fundamental polymeric structure is a multi-layer structure which has an inner core layer serving as a rubber component comprising a polybutadiene-based polymeric structure having low glass transition temperature and preferably being crosslinked, and has an outermost shell layer composed of a polymeric compound synthesized from one or more monomers selected from alkyl (meth)acrylate compounds or aromatic vinyl compounds and vinyl cyanide compounds for the purpose of improving adhesion between the resin composition and the matrix resin.

Such multi-layer structured polymers may preferably be exemplified by multi-layer structured polymers having an inner core layer composed of a rubber-like polymer containing crosslinked polybutadiene and an outermost shell layer composed of an alkyl (meth)acrylate-based polymer. As an inner core layer-forming component with rubber elasticity, a component having a polybutadiene-based polymeric structure is selected, including polybutadiene, a polybutadiene/polystyrene copolymer, etc. It should be noted that an alkyl (meth)acrylate or silicone or the like may be used as an additional component to be copolymerized. On the other hand, as an outermost shell layer-forming component, it is possible to use an alkyl (meth)acrylate or an aromatic vinyl compound (e.g., styrene) copolymerizable therewith or a vinyl cyanide compound (e.g., acrylonitrile), etc. More preferred examples include multi-layer structured polymers having an inner core layer composed of a polybutadiene-based polymer and an outermost shell layer composed of an alkyl methacrylate (e.g., polymethyl methacrylate). Further examples include multi-layer structured polymers designed to have three or more layers, such that the innermost core layer is formed from a polymer composed of aromatic vinyl monomers, the intermediate layer is formed from a rubber-like polybutadiene-based polymer, and further the outermost shell layer is formed from an alkyl (meth)acrylate-based polymer. Such a multi-layer structured polymer is effective for improvement in poor appearance (e.g., iridescence).

The content of such a multi-layer structured polymer is 0.5 to 30 parts by mass relative to 100 parts by mass of the aromatic polycarbonate resin(s). If the content is less than 0.5 parts by mass, impact strength cannot be improved sufficiently. On the other hand, if the content is greater than 30 parts by mass, heat resistance is more likely to be reduced. A preferred range of this content is 1 to 25 parts by mass, more preferably 2 to 15 parts by mass, relative to 100 parts by mass of the aromatic polycarbonate resin(s).

[9. Process for Preparation of Polycarbonate Resin Composition in Pellet Form]

There is no limitation on how to prepare a polycarbonate resin composition in pellet form for use in production of the sheet or film of the present invention, and a wide range of known processes may be used for this purpose.

By way of specific example, the polycarbonate resin and organic phosphorus-containing flame retardant intended in the present invention as well as other optionally required components may be pre-mixed using any type of mixer (e.g., a tumbler or a Henschel mixer), followed by melt kneading in a mixer such as a Banbury mixer, a roll, a brabender, a single-screw kneading extruder, a double-screw kneading extruder, a kneader or the like.

By way of another example, these individual components may be fed into an extruder through a feeder without being pre-mixed or after some of the components have been pre-mixed, followed by melt kneading to thereby prepare the polycarbonate resin composition of the present invention.

By way of yet another example, some of the components may be pre-mixed and fed into an extruder, followed by melt kneading to obtain a resin composition for use as a master batch, and this master batch may further be mixed again with the remaining components, followed by melt kneading to thereby prepare the polycarbonate resin composition of the present invention.

By way of yet another example, when a less dispersible component is mixed, such a less dispersible component may be dissolved or dispersed in a solvent such as water or an organic solvent, and the resulting solution or dispersion may be provided for kneading to thereby achieve enhanced dispersibility.

[10. Process for Production of Flame-retardant Sheet or Film]

The flame-retardant sheet or film of the present invention is molded from a polycarbonate resin composition containing a flame retardant. The pattern, color and size of this molded article are not limited in any way and may be determined as appropriate depending on its intended use. Moreover, this molded article may be provided with an additional thermoplastic resin layer by co-extrusion or heat lamination, in addition to a layer composed of the polycarbonate resin composition containing a flame retardant.

There is no limitation on how to produce the flame-retardant sheet or film, and a wide range of known processes for sheet or film production may be used for this purpose. For example, a polycarbonate resin composition in pellet form, which has been prepared as described above, may be extruded into a flat sheet through an extruder equipped with a T-die and then cooled with a chill roll to thereby obtain a desired flame-retardant sheet or film. Alternatively, individual components including a polycarbonate resin and a phosphorus-containing flame retardant may be mixed using any type of mixer, and the mixed materials may be directly extruded into a flat sheet through an extruder equipped with a T-die and then cooled with a chill roll to thereby form a flame-retardant sheet or film.

Moreover, during sheet or film formation, the lip gap of the T-die may be adjusted to ensure a uniform thickness of the sheet or film. In addition, a gear pump may be placed between the extruder and the T-die to suppress the pulsing of resin flow, thereby achieving further improvement in the accuracy of thickness. Further, during sheet or film molding, the ratio between the speed of the chill roll firstly coming in contact with a molten resin and the downstream roll speed may be adjusted to thereby obtain a sheet or film having a small thermal shrinkage factor. Using the thus obtained sheet or film having high accuracy of thickness and a small thermal shrinkage factor, cases or the like can be easily produced by fabrication. Furthermore, in the case of a sheet or film containing a cyclic phosphazene as a flame retardant, reductions in its properties under heat and moisture conditions are particularly prevented and the resulting sheet or film has better impact resistance.

In the present invention, the sheet or film thickness is controlled uniformly and the total light transmittance is kept down to 5% or less, thereby resulting in a sheet or film which is high in flame retardancy and has a good appearance sufficient to hide the contents when formed into a container. To uniformly control the sheet or film thickness in the TD direction, the lip gap of the T-die may be adjusted during sheet or film formation to ensure a uniform thickness distribution. In addition, to ensure a uniform thickness distribution in the direction (MD direction) parallel to the direction of resin flow during film or sheet molding, a gear pump may be placed between the extruder and the T-die to suppress the pulsing of resin flow. Moreover, during sheet or film molding, the ratio between the speed of the chill roll firstly coming in contact with a molten resin and the downstream roll speed may be adjusted to thereby obtain a sheet or film having a small thermal shrinkage factor. When formed into a battery pack case, such a sheet or film having a small thermal shrinkage factor is preferred because of having the effect of overcoming the problem of breakage due to stress generated upon shrinkage of the sheet or film used as a component owing to battery overheating, etc. The thermal shrinkage factor (JIS-K-7133, 120° C., 30 minutes) of the sheet or film is preferably 3% or less, more preferably 2% or less, and even more preferably 1% or less.

Uniform control of the thickness distribution ensures a uniform shrinkage factor, thereby resulting in the effect of improving uniformity and strength during welding. This is, for example, because seal strength can be prevented from varying. The thickness distribution is preferably within ±10%, more preferably ±5%, even more preferably ±3% of the average thickness. In the present invention, such a flame-retardant sheet or film composed of a polycarbonate resin composition may be processed into a container by being welded through ultrasonic welding or heat welding. Moreover, embossing may be provided on the sheet or film surface to thereby further improve heat-seal strength and also give a better appearance. In contrast, if the thickness distribution is ±10% or more, the sheet or film cannot have a uniform shrinkage factor and thereby has reduced strength and a poor appearance, so that there arises a problem in that when the sheet or film is processed into a container, the contents can be seen through thin-walled portions. To prevent the contents from being seen, the total light transmittance of the sheet or film is preferably 5% or less, and more preferably 1% or less.

[11. Properties of Flame-retardant Sheet or Film]

The sheet or film of the present invention formed from a polycarbonate resin composition has a thickness of 0.01 to 0.25 mm, preferably 0.02 to 0.22 mm, and more preferably 0.03 to 0.08 mm. Moreover, the thickness distribution of the sheet or film of the present invention is controlled to be within ±10% of the average thickness and preferably controlled within ±5%, more preferably within ±3% of the average thickness. In particular, the thickness in the TD direction, which is more difficult to control than in the MD direction, is controlled in this way. As a result, the sheet or film appearance is improved and the contents (e.g., batteries) will be prevented from being seen from the outside only through thin-walled portions in the sheet or film.

The sheet or film of the present invention has a total light transmittance of 5% or less, preferably 3% or less, and more preferably 1% or less. Thus, the sheet or film of the present invention whose total light transmittance is sufficiently low is excellent in light-blocking properties. Moreover, the sheet or film of the present invention has a UL94 flame retardancy of VTM-0 or VTM-1, preferably VTM-0, as a test piece of 0.01 to 0.25 mm thickness, and is also excellent in flame retardancy.

[12. Production of Battery Pack Case and Battery Pack]

The battery pack case of the present invention may be produced by being processed in any shape, e.g., by welding stacked layers of the flame-retardant sheet or film through ultrasonic welding or heat sealing, or by molding a polycarbonate resin composition containing a flame retardant around the edges of the sheet or film through film insert molding. More specifically, the flame-retardant sheet or film of the present invention may be stacked in two layers and processed into a pouch-like pocket shape by heat sealing or ultrasonic welding along the four sides so as to allow batteries to be held therein. Alternatively, the flame-retardant sheet or film of the present invention may be folded and processed into a pouch-like pocket shape by heat sealing or ultrasonic welding along the three sides so as to allow batteries to be held therein.

In the above cases, the seal strength between the sheets or films welded by heat sealing or ultrasonic welding is 0.2 kgf/15 mm or more, preferably 1 kgf/15 mm or more, and more preferably 2 kgf/15 mm or more.

Alternatively, after being processed by vacuum molding or air-pressure molding, the flame-retardant sheet or film may be processed into any shape by heat welding, ultrasonic welding or film insert molding. More specifically, the flame-retardant film rolled into a cylindrical shape may be sealed at the top and bottom ends with injection-molded lid members each composed of a flame-retardant polycarbonate resin composition while allowing batteries to be held therein. Alternatively, the flame-retardant film may be processed into a box shape capable of holding batteries therein by being subjected to film insert molding to form a frame composed of a flame-retardant polycarbonate resin composition around the edges of the flame-retardant film.

Moreover, the battery pack of the present invention is configured to hold batteries in the battery pack case thus produced.

EXAMPLES

The present invention will be further described in more detail by way of the following examples. However, the present invention is not limited in any way by the following examples and can be implemented with modifications as appropriate without departing from the spirit of the present invention. It should be noted that the expression "parts" used hereinafter represents "parts by mass" on a mass basis, unless otherwise specified.

[Resin Pellet Preparation]

The individual components indicated in the tables described later were blended at the ratio (by mass) indicated in the tables described later and mixed for 20 minutes in a tumbler, and then fed into a double-screw extruder equipped with a single vent (TEM35B, Toshiba Machine Co., Ltd., Japan) and kneaded under conditions of a screw speed of 300 rpm, a discharge rate of 25 kg/hour and a barrel temperature of 240° C. The molten resin extruded into a strand shape was rapidly cooled in a water bath and pelletized with a pelletizer to obtain pellets for each polycarbonate resin composition.

[Film Production]

Pellets of each polycarbonate resin composition were fed into a film-forming single-screw extruder equipped with a T-die (PLAENGI-EXTRUDER, model PSV-30, PLAENGI Inc., Japan) and extruded under conditions of a screw speed of 40 rpm and a barrel temperature of 260° C. The molten resin extruded into a flat sheet was cooled with a chill roll (roll temperature: 110° C.) to obtain a film (width: about 200 mm) of the polycarbonate resin composition. In this step, the conditions were set to a roll speed of 1.0 m/min and a pinch roll speed of 1.1 m/min for production of a sheet of 0.2 mm thickness. For other thicknesses, the roll speed/pinch roll speed ratio was kept constant and the both take-up speeds were changed.

[Evaluation of Flame Retardancy]

For evaluation of the flame retardancy of each polycarbonate resin composition, test pieces for UL test obtained as above were conditioned for 48 hours in a thermostatic chamber at a temperature of 23° C. and a humidity of 50% and evaluated in accordance with the UL94 test (Test for Flammability of Plastics Materials for Parts in Devices and Appliances) established by the U.S. Underwriters' Laboratories Inc. (UL). UL94 VTM refers to a method for evaluation of flame retardancy based on the burning behavior of a film test piece wound cylindrically and clamped in a vertical position when contacted twice with 20 mm burner flame for 3 seconds. To have flame retardancy rated as VTM-0, VTM-1 or VTM-2, the test pieces are required to meet the standards shown in Table 1 below.

TABLE 1

|  | Flammability classification | | |
|---|---|---|---|
| Standards for evaluation | VTM-0 | VTM-1 | VTM-2 |
| Burning time of each test piece | ≤10 seconds | ≤30 seconds | ≤30 seconds |
| Total burning time of 5 test pieces | ≤50 seconds | ≤250 seconds | ≤250 seconds |
| Burning and glowing time of each test piece | ≤30 seconds | ≤60 seconds | ≤60 seconds |
| Burning up to marked line | No | No | No |
| Cotton ignition caused by drips | No | No | Yes |

The burning time intended here refers to a length of time during which a test piece keeps flame burning after removal of an ignition source. In addition, cotton ignition caused by drips is determined by whether or not drips from a test piece ignite marking cotton placed about 300 mm below the lower end of the test piece. Further, if even only one of the 5 samples does not meet the above standards, such a case was evaluated as NR (not rated) because of not meeting VTM-2. It should be noted that the expression "UL flame retardancy" is used in the tables described later.

[Evaluation of Total Light Transmittance]

In accordance with JIS K7105 (1981), the total light transmittance was measured under a D65 light source using a hazemeter (model HM-150, Murakami Color Research Laboratory Co., Ltd., Japan).

[Evaluation of Light-blocking Properties]

Samples were tested by visual inspection for their light-blocking properties and evaluated according to the following criteria: very good; good; slightly poor; and poor.

[Evaluation of Ultrasonic Weldability]

Procedures for ultrasonic welding test will be described below. The ultrasonic welder used was 2000Xdt (Emerson Japan, Ltd.), whose joint design was configured such that the butt joint was provided with a triangular ribbed energy director. Each sample was cut into strip specimens of 15 mm wide and 200 mm long, and two strip specimens were stacked and the welding test was performed on their midsection (15 mm wide and 4 mm long). The welding conditions were set to a frequency of 40 Hz, a trigger pressure of 44 N, a welding time of 0.4 seconds and a cooling time of 0.3 seconds. The tested samples were evaluated for their welding strength by tensile testing. The tensile tester used was Autograph AGS-100G (Shimadzu Corporation, Japan). Among the four sides generated upon welding, one side and its opposite side were chucked between upper and lower tensile jigs, followed by tensile testing at a rate of 300 mm/seconds. The maximum load at break was measured for each sample and compared with the breaking strength of the base material. A sample whose maximum load at break was equal to or greater than the breaking strength of the base material was evaluated to have sufficient welding strength. In contrast, a sample whose maximum load at break was less than the breaking strength of the base material was evaluated to have insufficient welding strength because its welded portions were deemed to be broken.

[Evaluation of Flexibility]

A bending test was performed to fold each film sample into halves. A film sample which was not broken was evaluated to have sufficient flexibility, whereas a film sample which was broken was evaluated to have insufficient flexibility.

[Evaluation of Battery Pack Formation]

A resin composition which was found to be capable of film formation and was evaluated to have a sufficient appearance, welding strength and flexibility when molded into a film as described above was evaluated to be able to form a battery pack case.

The components and their ratio of Examples 1 to 16 and Comparative Examples 1 to 11 are summarized in Tables 2 to 4 below, and their properties are summarized in Tables 3 and 4 below.

TABLE 2

| | Abbreviation | |
|---|---|---|
| Aromatic polycarbonate resin | (A) | Aromatic polycarbonate resin prepared starting from bisphenol A by interfacial polymerization process, viscosity average molecular weight: commercially available from Mitsubishi Engineering-Plastics Corporation (Japan) under the trade name "Iupilon ® S3000" |

TABLE 2-continued

| | Abbreviation | |
|---|---|---|
| Flame retardant | (B-1) | Cyclic phosphazene, commercially available from Fushimi Pharmaceutical Co.. Ltd. (Japan) under the trade name "Rabitle FP110" |
| | (B-2) | 1,3-Phenylene bis(di-2,6-xylenyl phosphate), commercially available from Daihachi Chemical Industry Co., Ltd. (Japan) under the trade name "PX-200" |
| | (B-3) | Triphenyl phosphate, commercially available from Daihachi Chemical Industry Co.. Ltd. (Japan) under the trade name "TPP" |
| Carbon black | (C) | Commercially available from Mitsubishi Chemical Corporation (Japan) under the trade name "Mitsubishi Carbon Black #1000" |
| Inorganic filler | (D) | Talc, commercially available from Hayashi Kasei Co., Ltd. (Japan) under the trade name "Micron White 5000S" |
| Fluoropolymer | (E) | Fibril-forming fluoropolymer. commercially available from Daikin Industries. Ltd. (Japan) under the trade name "FA-500B" |
| Heat stabilizer | (F-1) | Tris(2.4-di-tert-butylphenyl)pentaerythritol phosphite, commercially available from ADEKA under the trade name "Adekastab 2112" |
| | (F-2) | Pentaerythritol tetrakis[3-(3,5-di-tert-butyl-4-hydroxyphenyl)-propionate], commercially available from BASF under the trade name "Irganox 1010" |

TABLE 3

| | Abbr. | Unit | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Composition | A | parts by mass | 100 | 100 | 100 | 100 | 100 | 100 | 100 | 100 |
| | B-1 | parts by mass | 13.5 | 13.5 | 13.5 | 13.5 | 13.5 | 13.5 | 13.5 | 13.5 |
| | B-2 | parts by mass | | | | | | | | |
| | B-3 | parts by mass | | | | | | | | |
| | C | parts by mass | | | 1 | 1 | 1 | 1 | 1 | 1 |
| | D | parts by mass | | | | | | 4 | 4 | 4 |
| | E | parts by mass | | | | | | | | 0.6 |
| | F-1 | parts by mass | 0.06 | 0.06 | 0.06 | 0.06 | 0.06 | 0.06 | 0.06 | 0.06 |
| | F-2 | parts by mass | 0.04 | 0.04 | 0.04 | 0.04 | 0.04 | 0.04 | 0.04 | 0.04 |
| Thickness | Film thickness | [mm] | 0.2 | 0.05 | 0.2 | 0.05 | 0.2 | 0.1 | 0.04 | 0.2 |
| | Thickness distribution | | +3%, −5% | +7%, −6% | +2%, −4% | +4%, −6% | +8%, −5% | +2%, −7% | +8%, −3% | +8%, −6% |
| | Film moldability | | Good | Good | Good | Good | Good | Good | Good | Good |
| | Film appearance | | Good | Good | Good | Good | Good | Good | Good | Good |
| | UL flame retardancy | | VTM-0 | VTM-0 | VTM-0 | VTM-0 | VTM-0 | VTM-0 | VTM-0 | VTM-0 |
| | Total burning time | [seconds] | 47 | 39 | 38 | 36 | 34 | 20 | 4 | 14 |
| | Total light transmittance | [%] | 89 | 91 | 0 | 0 to 0.3 | 0 | 0 | 0 to 0.9 | 0 |
| | Light-blocking properties | | Poor | Poor | Very good | Good | Very good | Very good | Good | Very good |
| | Ultrasonic weldability | Good: base material breakage Poor: welded portion breakage, as evaluated by peel test | Good | Good | Good | Good | Good | Good | Good | Good |
| | Flexibility | Good: not broken Poor: broken, as evaluated by bending test | Good | Good | Good | Good | Good | Good | Good | Good |
| Formation of battery pack | | | Formed | Formed | Formed | Formed | Formed | Formed | Formed | Formed |

| | Abbr. | Unit | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| Composition | A | parts by mass | 100 | 100 | 100 | 100 | 100 | 100 | 100 | 100 |
| | B-1 | parts by mass | 13.5 | 13.5 | 13.5 | 13.5 | 30 | | | |
| | B-2 | parts by mass | | | | | | 13.5 | 13.5 | 13.5 |
| | B-3 | parts by mass | | | | | | | | |
| | C | parts by mass | 1 | 1 | 1 | 1 | 1 | 1 | 1 | 1 |
| | D | parts by mass | | | 4 | 4 | 4 | 4 | 4 | 4 |
| | E | parts by mass | 0.6 | 0.6 | 0.6 | 0.6 | | | | |
| | F-1 | parts by mass | 0.06 | 0.06 | 0.06 | 0.06 | 0.06 | 0.06 | 0.06 | 0.06 |
| | F-2 | parts by mass | 0.04 | 0.04 | 0.04 | 0.04 | 0.04 | 0.04 | 0.04 | 0.04 |
| Thickness | Film thickness | [mm] | 0.08 | 0.04 | 0.2 | 0.05 | 0.05 | 0.19 | 0.1 | 0.04 |
| | Thickness distribution | | +9%, −2% | +8%, −9% | +7%, −8% | +9%, −8% | +6%, −8% | +4%, −10% | +3%, −5% | +8%, −6% |
| | Film moldability | | Good | Good | Good | Good | Good | Good | Good | Good |
| | Film appearance | | Good | Good | Good | Good | Good | Good | Good | Good |
| | UL flame retardancy | | VTM-0 | VTM-0 | VTM-0 | VTM-0 | VTM-0 | VTM-0 | VTM-0 | VTM-0 |
| | Total burning time | [seconds] | 4 | 12 | 10 | 10 | 11 | 35 | 30 | 10 |

TABLE 3-continued

|  |  |  |  |  |  |  |  |  |
|---|---|---|---|---|---|---|---|---|
| Total light transmittance [%] | 0 to 0.1 | 3 | 0 | 0 to 0.4 | 0 to 0.4 | 0 | 0 | 0 to 0.3 |
| Light-blocking properties | Good | Slightly poor | Very good | Good | Good | Very good | Very good | Good |
| Ultrasonic weldability<br>Good: base material breakage<br>Poor: welded portion breakage, as evaluated by peel test | Good | Good | Good | Good | Good | Good | Good | Good |
| Flexibility<br>Good: not broken<br>Poor: broken, as evaluated by bending test | Good | Good | Good | Good | Good | Good | Good | Good |
| Formation of battery pack | Formed | Formed | Formed | Formed | Formed | Formed | Formed | Formed |

TABLE 4

|  | Abbr. | Unit | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|
| Composition | A | parts by mass | 100 | 100 | 100 | 100 | 100 | 100 |
|  | B-1 | parts by mass | 5 | 5 | 40 | 13.5 | 13.5 | 13.5 |
|  | B-2 | parts by mass |  |  |  |  |  |  |
|  | B-3 | parts by mass |  |  |  |  |  |  |
|  | C | parts by mass | 1 | 1 | 1 | 15 | 1 | 1 |
|  | D | parts by mass | 4 | 4 | 4 | 4 | 15 | 15 |
|  | E | parts by mass |  |  |  |  |  |  |
|  | F-1 | parts by mass | 0.06 | 0.06 | 0.06 | 0.06 | 0.06 | 0.06 |
|  | F-2 | parts by mass | 0.04 | 0.04 | 0.04 | 0.04 | 0.04 | 0.04 |
| Thickness | Film thickness | [mm] | 0.2 | 0.05 |  | 0.2 | 0.2 | 0.05 |
|  | Thickness distribution |  | +6%, −5% | +8%, −9% |  | +5%, −4% | +6%, −5% | +7%, −8% |
| Film moldability |  |  | Good | Good | Poor | Good | Good | Good |
| Film appearance |  |  | Good | Good | Good | Good | Good | Good |
| UL flame retardancy |  |  | VTM-2 | VTM-2 |  | VTM-0 | Not tested | Not tested |
| Total burning time | [seconds] |  | 25 | 69 |  | 39 | — | — |
| Total light transmittance | [%] |  | 0 to 0.4 | 0 |  | 0 | 0 | 0 to 0.4 |
| Light-blocking properties |  |  | Good | Very good |  | Very good | Good | Good |
| Ultrasonic weldability<br>Good: base material breakage<br>Poor: welded portion breakage, as evaluated by peel test |  |  | Good | Good |  | Good | Good | Good |
| Flexibility<br>Good: not broken, Poor: broken, as evaluated by bending test |  |  | Good | Good |  | Poor | Poor | Poor |
| Formation of battery pack case |  |  | Formed | Formed | Not formed | Not formed | Not formed | Not formed |

|  | Abbr. | Unit | Comparative Ex. 7 | Comparative Ex. 8 | Comparative Ex. 9 | Comparative Ex. 10 | Reference Ex. 11 |
|---|---|---|---|---|---|---|---|
| Composition | A | parts by mass | 100 | 100 | 100 | 100 | 100 |
|  | B-1 | parts by mass | 13.5 | 13.5 | 13.5 |  |  |
|  | B-2 | parts by mass |  |  |  | 13.5 |  |
|  | B-3 | parts by mass |  |  |  |  | 13.5 |
|  | C | parts by mass | 1 | 1 |  | 1 | 1 |
|  | D | parts by mass |  |  | 4 |  |  |
|  | E | parts by mass | 1 | 1 |  | 0.6 | 0.6 |
|  | F-1 | parts by mass | 0.06 | 0.06 | 0.06 | 0.06 | 0.06 |
|  | F-2 | parts by mass | 0.04 | 0.04 | 0.04 | 0.04 | 0.04 |
| Thickness | Film thickness | [mm] | 0.2 | 0.04 | 0.04 | 0.05 | 0.05 |
|  | Thickness distribution |  | +15%, −18% | +21%, −25% | +19%, −16% | +17%, −20% | +2%, −5% |
| Film moldability |  |  | Good | Good | Good | Good | Good |
| Film appearance |  |  | Poor | Poor | Poor | Poor | Poor |
| UL flame retardancy |  |  | Not rated | Not rated | VTM-0 | Not rated | VTM-0 |
| Total burning time | [seconds] |  | 24 | 20 | 10 | 57 | 20 |
| Total light transmittance | [%] |  | 0 | 3.5 | 0 to 2.2 | 10.8 | 0 to 0.3 |

TABLE 4-continued

| | | | | | | |
|---|---|---|---|---|---|---|
| Light-blocking properties | | Very good | Slightly poor | Slightly poor | Poor | Very good |
| Ultrasonic weldability | Good: base material breakage Poor: welded portion breakage, as evaluated by peel test | Poor | Poor | Poor | Poor | Good |
| Flexibility | Good: not broken, Poor: broken, as evaluated by bending test | Good | Good | Good | Good | Good |
| Formation of battery pack case | | Not formed | Not formed | Not formed | Not formed | Not formed |

As can be seen from Tables 3 and 4, Examples 1 to 16 resulted in sheets or films which were highly flame retardant because of comprising the phosphorus compound-containing flame retardant (B-1 or B-2) and whose thickness in the TD direction was substantially uniform. In particular, although thin sheets or films generally tend to be less flame retardant, most of the sheets or films in the above examples achieved flame retardancy as high as VTM-0, in spite of their thickness as thin as 0.04 to 0.2 mm. Moreover, all the examples also showed good results for film moldability. In particular, the sheets or films obtained upon addition of carbon black in Examples 3 to 16 were found to have not only high light-blocking properties and a good appearance, but also a reduced burning time, and were less likely to be seen through when formed into battery packs.

It should be noted that Example 13 was designed to use 30 parts by mass of the phosphorus compound-containing flame retardant, relative to 100 parts by mass of the polycarbonate resin; and hence the flame retardant was used in an amount greater than 13.5 parts by mass which was used in the other examples. Thus, even in Example 13 where the flame retardant was used in an amount of 30 parts by mass, the resulting sheet or film was good not only in flame retardancy but also in film moldability, and was also excellent in light-blocking properties and appearance. This finding confirmed that good results were obtained, at least when the phosphorus compound-containing flame retardant was used at a ratio of about 10 parts by mass to 30 parts by mass relative to 100 parts by mass of the polycarbonate resin.

On the other hand, the compositions of Comparative Examples (Reference Examples) 1 to 11 were found to be less good in at least any one of flame retardancy, light-blocking properties, film moldability and appearance when compared to the examples.

In Comparative Examples 1 and 2, the amount of the flame retardant (B-1) was as low as 5 parts by mass, which led to a reduction in flame retardancy. Likewise, in Comparative Example 3, the amount of the flame retardant (B-1) was as high as 40 parts by mass, so that film molding was difficult.

In Reference Example 4, the amount of carbon black (C) was as high as 15 parts by mass, so that breakage upon film bending was unavoidable and no battery pack case was able to be formed.

In Reference Examples 5 and 6, the amount of talc (D) was as high as 15 parts by mass, so that no battery pack case was able to be formed due to insufficient flexibility. In addition, breakage was unavoidable during the preparation of cylindrical test pieces for use in the evaluation of flame retardancy, so that the evaluation of flame retardancy was also impossible.

In Comparative Examples 7 and 8, the content of the fluoropolymer (E) was as high as 1 part by mass, so that these examples did not meet the standards in flammability evaluation because the films largely shrank during burning and reached the marked line. Further, the presence of the fluoropolymer caused a larger pulsing of resin flow, which in turn caused large inconsistencies in thickness, thereby leading to a poor appearance.

In Comparative Examples 9 and 10, large inconsistencies in thickness resulted in a poor appearance. Further, large inconsistencies in thickness also resulted in insufficient ultrasonic weldability, so that no battery pack case was able to be formed.

In Reference Example 11, upon addition of a non-condensed phosphate ester flame retardant, volatiles were generated in large amounts during sheet or film molding due to low thermal decomposition temperature of the flame retardant. These volatiles led to deposit contamination on the roll surface, and such contaminants were transferred to the sheet or film. For this reason, no sheet or film with a good appearance was able to be obtained.

It should be noted that the compositions of the above reference examples include those which are sufficient for use as flame-retardant films, although they were difficult to form into battery pack cases. For example, as can be seen from Table 4, the composition of Reference Example 4 is excellent in flame retardancy and light-blocking properties and also has a good appearance, and therefore can be used satisfactorily as a flame-retardant film in some applications not requiring high flexibility.

Moreover, for example, the compositions of Reference Examples 5 and 6 were not subjected to the above flame retardancy test because no test piece was formed from these compositions. However, the high content of talc (D) would not cause a reduction in their flame retardancy, and their film appearance and light-blocking properties were found to be good. For this reason, the compositions of these reference examples would also be able to be used satisfactorily as flame-retardant films in some applications, except for use as battery pack cases.

Furthermore, Comparative Example 9 and Reference Example 11 showing a poorer film appearance have been confirmed to be excellent in flame retardancy, and in particular, the composition of Reference Example 11 is also excellent in light-blocking properties. Thus, the compositions of these comparative or reference examples can also be used as flame-retardant films in some applications not requiring high quality for appearance, except for use as battery pack cases.

In view of the results of the above examples, reference examples and comparative examples, the present invention was confirmed to enable the provision of molded articles with fewer color irregularities and excellent in flame retardancy and flexibility. It should be noted that in Comparative Examples 1 and 2, the amount of the phosphorus compound-containing flame retardant was as low as 5 parts by mass, which led to a reduction in flame retardancy, although the most excellent evaluation VTM-0 is achieved in almost all cases of Examples 1 to 12 and 14 to 16 where the same flame retardant was used in an amount of 13.5 parts by mass. This finding indicates that flame retardancy is improved if the amount of the flame retardant is greater than 5 parts by mass, and more specifically, flame retardancy high enough for use as a thin sheet or film molded article can be achieved when the flame retardant is used in an amount of 7 parts by mass or more. Moreover, the present invention was also confirmed to enable the provision of thin sheet or film molded articles having higher flame retardancy and good light-blocking properties when further using a given amount of carbon black.

Furthermore, good ultrasonic weldability and flexibility were achieved in all the examples, when compared to the comparative examples (see Table 3). In view of this finding, for example, it was confirmed that a thin sheet or film obtained from the composition of the present invention was able to be stacked in two layers and processed into a pouch-like pocket shape by heat sealing or ultrasonic welding along the edges, or alternatively, was able to be folded and processed into a pouch-like pocket shape by heat sealing or ultrasonic welding along the edges while allowing batteries to be held therein. Moreover, it was also confirmed that the composition of the present invention was able to be processed into a flame-retardant sheet or film by vacuum molding or air-pressure molding and then processed into a box shape capable of holding batteries therein by heat welding, ultrasonic welding or film insert molding. In view of the foregoing, the use of a flame-retardant sheet or film obtained from the composition of the present invention enables the production of a battery pack case and a battery pack comprising batteries held in the battery pack case (see Table 3, the row "Formation of battery pack case").

In view of the foregoing, a thin sheet or film obtained from the composition of the present invention is excellent in ultrasonic weldability and other properties, and therefore can be used as a packaging material for battery packs.

The invention claimed is:

1. A flame-retardant sheet or film having a thickness of 0.01 to 0.22 mm, which is molded from a polycarbonate resin composition containing, relative to 100 parts by mass of a polycarbonate resin, 7 to 30 parts by mass of a flame retardant comprising a phosphorus-containing flame retardant represented by the following general formula (1) or (2) or (3), wherein the thickness distribution at the time of sheet or film molding in the direction (TD) perpendicular to the direction of resin flow is controlled to be within ±10% of the average thickness:

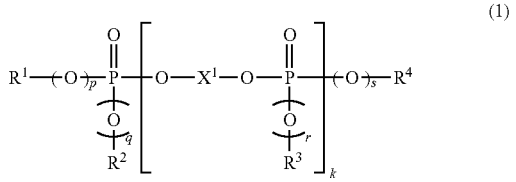

(1)

wherein in formula (1), $R^1$, $R^2$, $R^3$ and $R^4$ each represent an alkyl group containing 1 to 6 carbon atoms or an aryl group containing 6 to 20 carbon atoms which may be substituted with an alkyl group, p, q, r and s are each 0 or 1, k is an integer of 1 to 5, and $X^1$ represents an arylene group;

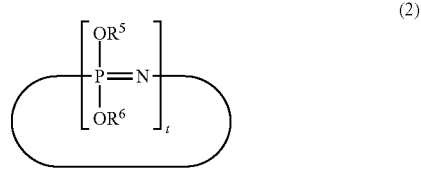

(2)

wherein in formula (2), t is an integer of 3 to 25, and $R^5$ and $R^6$, which may be the same or different, each represent an aryl group or an alkylaryl group; or

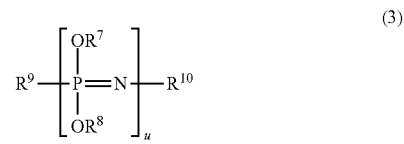

(3)

wherein in formula (3), u is an integer of 3 to 10,000, $R^9$ represents at least one selected from a —N=P($OR^7$)$_3$ group, a —N=P($OR^8$)$_3$ group, a —N=P(O)$OR^7$ group and a —N=P(O)$OR^8$ group, and $R^{10}$ represents at least one selected from a —P($OR^7$)$_4$ group, a —P($OR^8$)$_4$ group, a —P(O)($OR^7$)$_2$ group and a —P(O)($OR^8$)$_2$ group, wherein $R^7$ and $R^8$, which may be the same or different, each represent an aryl group or an alkylaryl group; and wherein the polycarbonate resin composition further contains carbon black, wherein the content of carbon black is 0.0001 to 10 parts by mass, relative to 100 parts by mass of the polycarbonate resin.

2. The flame-retardant sheet or film according to claim 1, wherein the polycarbonate resin composition further contains 12 parts by mass or less of one or more inorganic fillers, relative to 100 parts by mass of the polycarbonate resin.

3. The flame-retardant sheet or film according to claim 2, wherein the total light transmittance of the flame-retardant sheet or film is 5% or less.

4. The flame-retardant sheet or film according to claim 1, wherein the polycarbonate resin composition further contains 1 part by mass or less of a fibril-forming fluoropolymer, relative to 100 parts by mass of the polycarbonate resin.

5. The flame-retardant sheet or film according to claim 1, wherein the polycarbonate resin composition further contains one or more stabilizers selected from the group consisting of antioxidants and UV absorbers.

6. The flame-retardant sheet or film according to claim 1, wherein the UL94 flame retardancy is VTM-0 or VTM-1.

7. The flame-retardant sheet or film according to claim 1, wherein the flame-retardant sheet or film is produced by extruding the polycarbonate resin composition through an extruder to obtain a sheet, and cooling the sheet with a chill roll.

8. A battery pack case, which is configured such that the flame-retardant sheet or film according to claim 1 is processed into a box shape or a pocket shape to hold batteries therein.

9. The battery pack case according to claim 8, wherein the flame-retardant sheet or film is stacked in two layers and processed into a pouch-like pocket shape by heat sealing or ultrasonic welding along four sides to thereby allow batteries to be held therein.

10. The battery pack case according to claim 8, wherein the flame-retardant sheet or film is folded and processed into a pouch-like pocket shape by heat sealing or ultrasonic welding along three sides to thereby allow batteries to be held therein.

11. The battery pack case according to claim 8, wherein the flame-retardant film is rolled into a cylindrical shape and sealed at the top and bottom ends with injection-molded lid members each consisting of the flame-retardant polycarbonate resin composition to thereby allow batteries to be held therein.

12. The battery pack case according to claim 8, wherein the flame-retardant film is processed into a box shape by being subjected to film insert molding to form a frame consisting of the flame-retardant polycarbonate resin composition around the edges of the flame-retardant film to thereby allow batteries to be held therein.

13. A battery pack, which comprises the battery pack case according to claim 8 and batteries held therein.

\* \* \* \* \*